United States Patent
Cui et al.

(10) Patent No.: US 10,484,839 B2
(45) Date of Patent: Nov. 19, 2019

(54) COMMUNICATIONS DEVICE, BASE STATION, AND COMMUNICATIONS METHOD

(71) Applicant: SONY CORPORATION, Tokyo (JP)

(72) Inventors: Qimei Cui, Beijing (CN); Tong Zhang, Beijing (CN); Zhongbin Qin, Beijing (CN); Weijuan Gao, Beijing (CN); Hui Liang, Beijing (CN); Qinyan Jiang, Beijing (CN)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/321,822

(22) PCT Filed: Jun. 25, 2015

(86) PCT No.: PCT/CN2015/082320
§ 371 (c)(1),
(2) Date: Dec. 23, 2016

(87) PCT Pub. No.: WO2016/000556
PCT Pub. Date: Jan. 7, 2016

(65) Prior Publication Data
US 2017/0134913 A1    May 11, 2017

(30) Foreign Application Priority Data

Jul. 1, 2014   (CN) .......................... 2014 1 0309377

(51) Int. Cl.
*H04W 4/08* (2009.01)
*H04B 7/06* (2006.01)
(Continued)

(52) U.S. Cl.
CPC ................ *H04W 4/08* (2013.01); *H04B 7/06* (2013.01); *H04W 16/18* (2013.01); *H04W 16/28* (2013.01)

(58) Field of Classification Search
CPC ....... H04W 4/08; H04W 16/18; H04W 16/28; H04B 7/06
(Continued)

(56) References Cited

U.S. PATENT DOCUMENTS

2010/0248728 A1\* 9/2010 Sun ........................ H04W 16/10
455/450
2011/0149875 A1\* 6/2011 Ahuja ..................... H04L 47/72
370/329
(Continued)

FOREIGN PATENT DOCUMENTS

CN     103178882 A    6/2013
CN     103684700 A    3/2014
(Continued)

OTHER PUBLICATIONS

International Search Report dated Sep. 30, 2015 in PCT/CN2015/082320 filed Jun. 25, 2015.
(Continued)

*Primary Examiner* — Christopher R Crompton
(74) *Attorney, Agent, or Firm* — Xsensus, LLP

(57) ABSTRACT

A communications apparatus, a base station, and a communications method. The communications apparatus includes processing circuitry configured to: group users in a 3D beam-forming space of a current cell into multiple space user groups; determine group configuration information of the users in the 3D beam-forming space of the current cell; notify a neighbor cell of the group configuration information of the users in the 3D beam-forming space of the current cell to assist inter-cell interference coordination, wherein the current cell is configured with an antenna array having multiple physical antennas to achieve 3D beam-forming.

23 Claims, 16 Drawing Sheets

(51) Int. Cl.
*H04W 16/18* (2009.01)
*H04W 16/28* (2009.01)

(58) Field of Classification Search
USPC .......................................... 370/329
See application file for complete search history.

(56) References Cited

U.S. PATENT DOCUMENTS

| 2011/0321050 A1* | 12/2011 | Ho ..................... H04W 4/08 |
| | | 718/102 |
| 2013/0051231 A1* | 2/2013 | Cai .................... H04W 28/22 |
| | | 370/230 |
| 2015/0016379 A1* | 1/2015 | Nam ................... H04B 7/0456 |
| | | 370/329 |
| 2015/0099527 A1* | 4/2015 | Zhuang ................. H04B 7/024 |
| | | 455/452.1 |
| 2016/0337916 A1* | 11/2016 | Deenoo .................. H04W 8/22 |

FOREIGN PATENT DOCUMENTS

| CN | 103780347 A | 5/2014 |
| GB | 2507782 A | 5/2014 |

OTHER PUBLICATIONS

"Considerations on 3D-channel model for 3D Beamforming", New Postcom, 3GPP TSG RAN WG1 Meeting #72, R1-130160, Jan. 28-Feb. 1, 2013, 5 pages.

\* cited by examiner

COMMUNICATIONS DEVICE, BASE STATION, AND COMMUNICATIONS METHOD

FIELD

The present disclosure generally relates to the technical field of wireless communication, and in particular to a communication apparatus, base station and communication method for performing wireless communication in a wireless communication system.

BACKGROUND

This section provides background information related to the present disclosure, which is not necessarily prior art.

Recently, a 3 dimensions multiple input multiple output (3D MIMO) system is increasingly popular, since a vertical dimension is considered in the 3D MIMO system. The 3D MIMO system brings the following two advantages: firstly, saving an arrangement space of a large-scale antenna; and secondly, providing another frequency selective dimension for inter-cell interference coordination (ICIC).

The 3D MIMO system is mainly applied to a high building scene and an indoor scene. For the high building scene, a macro cell arranged outside the building transmits to a user in the building using a 3D wave beam. The indoor scene is also an object for application.

In the 3D MIMO system, a position of a user is described in a 3D mode, which describes the position of the user more accurately than the previous 2 dimensions (2D) MIMO system. However, in the existing 3D MIMO technology, it is inevitable to interfere with a neighbor cell. Hence, it needs to sufficiently utilize the advantage of the 3D MIMO technology and perform inter-cell interference coordination.

In addition, high overhead of the reference signal severely limits the performance of the 3D MIMO system. A study report from the China Mobile points out that, overhead of the reference signals of a 8 antenna port, 64 antenna port and 128 antenna port accounts for 1%, 8% and 16% of the total overhead respectively.

The 3Gpp Rel-8 standard only defines the maximum 4 antenna port, while the Rel-10 extends the maximum antenna port to 8. Accordingly, in order to reduce overhead of the reference signal, the Rel-10 decompose a part of functions of a common reference signal (also referred to as cell-specific reference signal, CRS) into channel state information reference signal (CSI-RS) and demodulation reference signal (DMRS), which correspond to channel estimation and demodulation respectively.

For the long term evolution (LTE), it is stipulated in the 3D MIMO system that at least 32 antennae need to be used. Therefore, it is attracting to improve the system performance utilizing the existing reference signal (RS) structure (the RS structure before Rel-12) in the 3D MIMO system.

SUMMARY

This section provides a general summary of the present disclosure, and is not a comprehensive disclosure of its full scope or all of its features.

An object of the present disclosure is to provide a communication apparatus, base station and communication method for performing wireless communication in a wireless communication system, which can reduce inter-cell interference and optimize network scheduling.

Another object of the present disclosure is to provide a communication apparatus, base station and communication method for performing a wireless communication in a wireless communication system, which can reuse pilot design before Rel-12 to reduce overhead of a reference signal.

According to an aspect of the present disclosure, a communication apparatus is provided, which includes: a user grouping unit configured to group users in a 3D beamforming space of a current cell into multiple space user groups; a group configuration information determining unit configured to determine group configuration information of the users in the 3D beamforming space of the current cell; and a notifying unit configured to notify a neighbor cell of the group configuration information of the users in the 3D beamforming space of the current cell to assist inter-cell interference coordination, where the current cell is configured with an antenna array including multiple physical antennae to achieve 3D beamforming.

According to a specific embodiment of the present disclosure, the communication apparatus may further include an antenna grouping unit configured to group the multiple physical antennae into multiple antenna groups according to the group configuration information of the users, where each of the multiple antenna groups includes N antennae, where $N=2^n$, and n is a non-negative integer.

According to another aspect of the present disclosure, a base station is provided, which includes the communication apparatus described above.

According to another aspect of the present disclosure, a communication method is provided, which includes: grouping users in a 3D beamforming space of a current cell into multiple space user groups; determining group configuration information of the users in the 3D beamforming space of the current cell; and notifying a neighbor cell of the group configuration information of the users in the 3D beamforming space of the current cell to assist inter-cell interference coordination, where the current cell is configured with an antenna array including multiple physical antennae to achieve 3D beamforming.

According to a specific embodiment of the present disclosure, the communication method may further include: grouping the multiple physical antennae into multiple antenna groups according to the group configuration information of the users, where each of the multiple antenna groups includes N antennae, where $N=2^n$, and n is a non-negative integer.

According to the communication apparatus, base station and communication method of the present disclosure, a strategy for space user grouping is provided, and group configuration information of space users can be interacted between adjacent cells, thereby reducing inter-cell interference and optimizing network scheduling.

According to the communication apparatus, base station and communication method of the present disclosure, a strategy for antenna grouping is further provided, which can reuse pilot design before the Rel-12, thereby reducing overhead of the reference signal.

In addition, according to another aspect of the present disclosure, a storage medium is further provided. The storage medium includes machine readable program codes. When executed on an information processing device, the program codes cause the information processing device to perform the communication method according to the present disclosure described above.

In addition, according to another aspect of the present disclosure, a program product is further provided. The program product includes machine executable instructions. When executed on an information processing device, the instructions cause the information processing device to perform the communication method according to the present disclosure described above.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments but not all possible implementations, and are not intended to limit the scope of the present disclosure. In the drawings.

Figure 1:
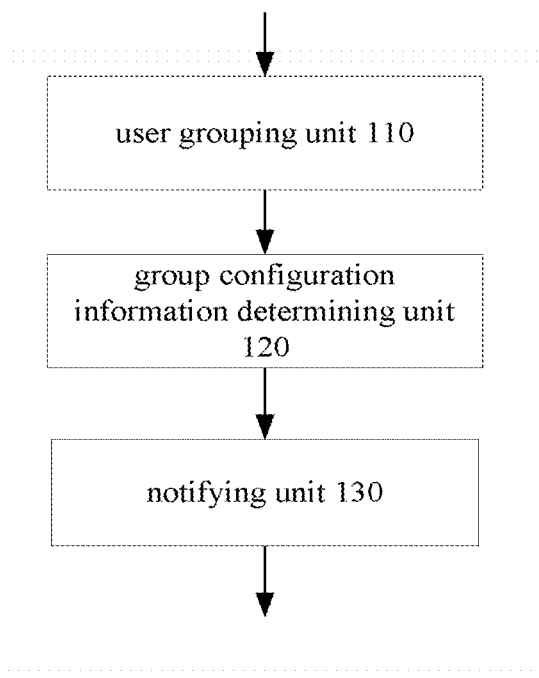
FIG. 1 shows a block diagram of a structure of a communication apparatus according to a first embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. It should be noted that corresponding reference numerals indicate corresponding parts throughout the several views of the drawings.

DETAILED DESCRIPTION OF THE EMBODIMENTS

A wireless communication system described here may be applied to a wireless communication system compatible with 3GPP LTE, for example. One aspect of the LTE is of interest, which is referred to as "evolved UNITS terrestrial radio access network" (E-UTRAN) and a "UTRAN" communication system. In the E-UTRAN system, the e-Node B may be or directly connected to an access gateway (aGW) (sometimes referred to as service gateway, (sGW)). Each node B may perform, via a radio Uu interface, radio connection with multiple types of user equipment (UE, which generally includes a mobile transceiver or a mobile phone, and the UE may also be a fixed cellular phone, a mobile web browser, a laptop computer, a PDA, an MP3 player or a game device with a transceiver and so on).

In the present discussion, strengthening for a version 9 and a version 10 (sometimes referred to as "LTE-Advance") of the 3GPP standard is particularly considered. The future evolution of LTE has additional requirements and needs increased throughput. Although the E-UTRAN is used as a main example in the discussion, the present disclosure is not limited to the E-UTRAN, the LTE or the 3GPP system. Generally, the E-UTRAN resources are approximately temporarily assigned to one or more UEs over the network by using an assignment list or using a downlink resource assignment channel or a physical downlink control channel ("PDCCH"). The PDCCH is used to assign resources in other channels which include a physical downlink shared channel ("PDSCH"). LTE is a system based on a packet, therefore no dedicated connection may be reserved for communication between the UE and the network. The user generally schedules in each transmission time interval on a shared channel by a node B or an evolved node B (E-Node B). The node B or e-Node B controls communication between user equipment terminals in a cell which is served by the node B or e-Node B. Generally, the node B or e-Node N serves one cell. The node B or e-Node B may be referred to as "a base station". Resources for data transfer are assigned one time or assigned in a durable/semi-static manner.

In order to promote scheduling on the shared channel, the e-Nose B transfers, in a downlink channel PDCCH to a certain UE, resource allocation to the UE. Allocation information may be related to both an uplink channel and a downlink channel. The allocation information may include: which resource blocks to be allocated to the scheduled user in the frequency field, modulation and coding schemes to be used and a size of the transmission block.

The lowest layer, i.e., the first layer, for communication in the UTRAN or e-UTRAN system is implemented by a physical layer (PHY) in the UE and the node B or e-Node B, and the PHY performs physical transmission of packets between them via an air interface using a radio frequency signal. In order to ensure that the transferred packets are received, a method for automatic retransmission request (ARQ) and a hybrid automatic retransmission request (HARQ) is provided. Therefore, once the UE receives the packets via one of several downlink channels (including a dedicated channel and a shared channel), the UE performs communication error detection on the received packets, generally using cyclic redundancy check (CRC), and transfers a response in a subsequent subframe after receiving the packets on an uplink to the e-Node B or the base station. The response is an acknowledge (ACK) or non-acknowledge (NACK) message. If the response is NACK, the JUe-Node B automatically retransmits the packets in the subsequent subframe on the downlink (DL). Similarly, in a certain subframe later in time, the NACK/ACK message on the DL channel is used to respond any uplink (UL) transfer from the UE to the e-Node B to complete the HARQ. In this way, the packet communication system maintains robustness and has short waiting time and quick rotation.

The UTRAN or e-UTRAN may accommodate multiple types of UE. Presently, in the UTRAN and e_UTRAN system, a type of supported UE is UE supporting MIMO transfer. The MIMO UE may have multiple antennae and receivers rather than only one. For example, the MIMO UE may have 2, 4 or more antennae and receivers. In addition, the transceiving device such as a base station transfers a message for the UE on multiple antennae. By providing multiple channels for the transferred message, a possibility that the transferred message is received without errors is increased, thereby increasing coverage and robustness of the system.

The present disclosure is provided based on the above wireless communication system.

Examples of the present disclosure are described more sufficiently with reference to the drawings now. The following description is only exemplary substantially, and is not intended to limit the present disclosure, the application or usage thereof.

Example embodiments are provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed and that example embodiments may be embodied in many different forms, none of which should be construed to limit the scope of the disclosure. In addition, for clearness and conciseness, in some example embodiments, well-known processes, well-known device structures, and well-known technologies are not described in detail.

It should be noted here that, in order to avoid obscuring the present disclosure due to unnecessary details, only device structures and/or processing steps closely related to the solutions of the present disclosure are shown in the drawings, and other details less related to the present disclosure are omitted. In addition, it should be noted that, elements and features described in one drawing or one embodiment of the present disclosure may be combined with elements and features illustrated in one or more other drawings or embodiments.

Hereinafter structures and working principles of various communication apparatus according to specific embodiments of the present disclosure are descried with reference to FIGS. 1-9 firstly.

It should be noted that, an antenna array including multiple physical antennae is provided in a current cell served by the various communication apparatus according to the embodiments of the present disclosure, so as to achieve 3D beamforming. The 3D beamforming discussed here refers to that: a space weighted matrix is generated using channel information (for example channel state information (CSI)), a signal arrival angle and/or spatial position information of a target user at a transmission end, transmission data is weighted and then transmitted, a narrow transmission wave beam is formed, and energy is pointed at the target user, thereby improving a demodulation signal-noise ratio of the target user.

FIG. 1 shows a block diagram of a structure of a communication apparatus according to a first embodiment of the present disclosure.

As shown in FIG. 1, the communication apparatus according to the first embodiment of the present disclosure includes a user grouping unit 110, a group configuration information determining unit 120 and a notifying unit 130.

The user grouping unit 110 groups users in a 3D beamforming space of a current cell into multiple space user groups. The group configuration information determining unit 120 determines group configuration information of respective space user groups obtained by grouping of the user grouping unit 110. Then the notifying unit 130 notifies a neighbor cell of the group configuration information of the users in the 3D beamforming space of the current cell determined by the group configuration information determining unit 120, to assist inter-cell interference coordination.

In a case of grouping space users, the users may be grouped statically and/or dynamically according to spatial position information and/or traffic requirements of the users. Alternatively, the users may be grouped statically and/or dynamically according to or in combination with channel correlation. For example, a value $H_1H_2^H$ of the channel correlation may be used to determine the users and set a threshold value. If the value of the channel correlation is less than the set threshold value, the users may be grouped into a same space user group.

In the existing beamforming technology, an influence on a non-target user may be reduced by energy gathering, but it is inevitable to interference with adjacent user equipment using the same or close resource to a certain degree. In an example of the present disclosure, after active users in a current cell are grouped, the communication apparatus performs 3D beamforming processing on user equipments in each group. Specifically, for example, the same physical resource is only allocated to one user in one group to carry PDSCH data information of the user each time, and a 3D beamforming technology is used so that wave beams transmitted by multiple antennae are pointed at the user equipment. That is, user equipment in the same group is not scheduled simultaneously on a same resource block. In another aspect, in the present disclosure, users included in different groups may be far away from each other in geographical positions or have a low channel correlation (or strong orthogonality), and user equipment in multiple groups may be scheduled simultaneously (a difference value in a horizontal angle and a difference value in a vertical angle between users scheduled simultaneously in different space user groups should be larger than a predetermined threshold value). Therefore, the advantage of space grouping according to the present disclosure includes: further reducing interference between the user equipment in the cell while ensuring a certain resource utilizing efficiency. In addition, the communication apparatus according to the present disclosure interacts with the neighbor cell information on user grouping, to assist the neighbor cell to perform user grouping in cooperation or specific resource scheduling, thereby effectively avoiding that users located between two cells, particularly on a boundary, suffer unnecessary interference.

Here, the group configuration information of the users in the 3D beamforming space of the current cell determined by the group configuration information determining unit 120 includes but not limited to at least one of the followings: whether the users are grouped statically or dynamically; the number of different space user groups of which the users are scheduled simultaneously by the current cell through 3D beamforming on a same resource block; the number of users of each of the multiple space user groups; traffic flow and/or service quality (QoS) requirements of each of the multiple space user groups; a horizontal angle area and a vertical angle area of each of the multiple space user groups (the vertical angle area is preferable to improve group granularity and resource reusing efficiency, for example); and scheduling resources corresponding to each of the multiple space user groups. Preferably, the group configuration information includes information on a horizontal angle area and a vertical angle area of each space user group, so that the neighbor cell knows distribution of the user groups. The group configuration information may further include scheduling resources corresponding to respective space user groups, so that the neighbor cell knows that the current cell uses which resources to serve which user group. It should be understood that, the group configuration information may include no scheduling resource information. For example, the neighbor cell may determine, according to the distribution of user groups in the current cell, that the current cell and the neighbor cell do not have user groups with similar distribution, hence the neighbor cell may freely schedule resources for its users without knowing specific resource scheduling of the current cell. Therefore, in some embodiments, scheduling resource information corresponding to a respective space user group may be further transmitted in response to a request of the neighbor cell. In addition, in the present disclosure, the users may be grouped in multiple ways. For example, the users may be grouped statically or dynamically, or may be grouped based on a geographical position and based on the geographical position in combination with at least one of traffic, Qos requirements and channel correlation and so on. Therefore, in a case that there are multiple user grouping ways, the group configuration information may include a type of the grouping way, for example static or dynamic, which is illustrated in detail in the following embodiment. In order to further improve the performance of resource scheduling coordination between adjacent cells, the group configuration information may further include: the number of different space user groups of which the users are scheduled simultaneously by the current cell through 3D beamforming on a same resource block; the number of users in each space user group; and traffic flow and/or service quality (QoS) requirements of each space user group and so on.

The communication apparatus for performing wireless communication in a wireless communication system according to the embodiment can notify the neighbor cell of the group configuration information of the users in the 3D beamforming space of the current cell in a timely manner, thereby facilitating interference coordination between adjacent cells and being beneficial to optimize network scheduling.

Figure 2:
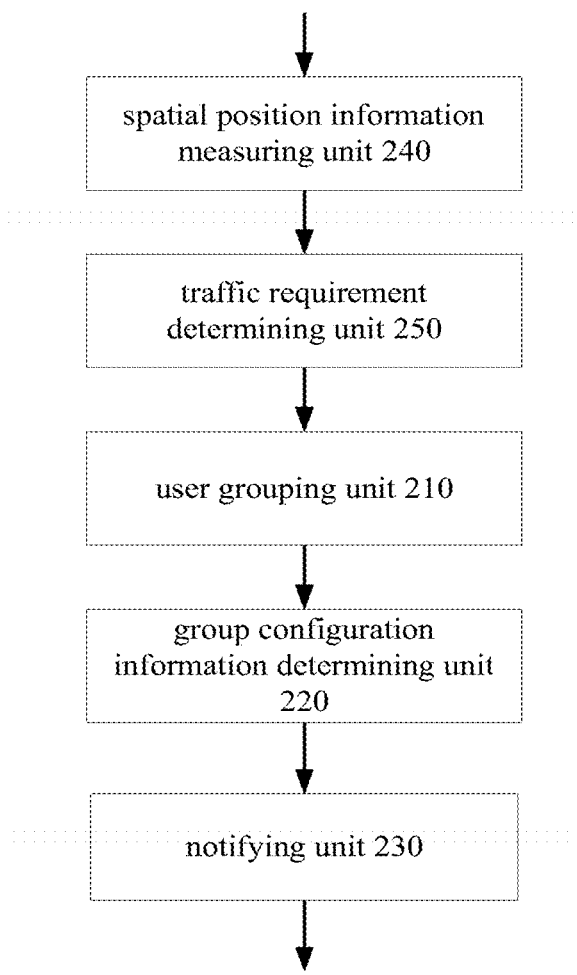
FIG. 2 shows a block diagram of a structure of a communication apparatus according to a second embodiment of the present disclosure.

In order to perform interference coordination between cells better, the user grouping unit needs to group space users in the current cell reasonably. Based on this, another communication apparatus is provided according to an embodiment of the present disclosure. FIG. 2 shows a block diagram of a structure of a communication apparatus according to a second embodiment of the present disclosure.

As shown in FIG. 2, the communication apparatus according to the first embodiment of the present disclosure includes a user grouping unit 210, a group configuration information determining unit 220, a notifying unit 230, a spatial position information measuring unit 240 and a traffic requirement determining unit 250.

The spatial position information measuring unit 240 may measure spatial position information of users in a 3D beamforming space according to uplink channel sounding information and/or satellitic geographical position information of an auxiliary global navigation satellite system (A-GNSS).

When measuring spatial position information of the users in the 3D beamforming space according to the uplink channel sounding information, i.e., Sounding Reference Signal (SRS), each user transmits the SRS signal to a base station of a cell where the user is located to perform channel sounding, and a multiple-antenna system may measure a vertical and horizontal arrival angles of the SRS signal. Space users are grouped according to the measurement result for each user.

When measuring spatial position information of the users in the 3D beamforming space according to A-GNSS satellite positioning information, each user measures its longitude and latitude by a global positioning system (GPS) as the spatial position information, and transmits the spatial position information to a base station of a cell where the user is located, so that space users are grouped according to the spatial position information.

Accordingly, the user grouping unit 210 may group the space users, for example statically, based on the spatial position information measured by the spatial position information measuring unit 240, and group the users in the 3D beamforming space of the current cell into multiple space user groups. Specifically, the user grouping unit 210 may group users in an area at a predetermined horizontal angle and a predetermined vertical angle in the 3D beamforming space into one space user group, thereby grouping the space users statically. In addition, in an example, the communication apparatus in the present disclosure is implemented as a macro base station, the macro base station shares a base band (ideal backhaul connection) with multiple small cell base stations, and the user equipment is located in an overlapped coverage range of the macro base station the small cell base stations and the user equipment is connected to both the macro base station and the small cell base station (for example by means of carrier aggregation). In this way, the macro base station may know the spatial position information of the user equipment without measuring (for example, in a case that the coverage range of the small cell is small, the coverage range of the small cell may be regarded as a position of the user equipment simply).

In some cases, loads are unbalanced in scheduling when the space users are grouped statically. For example, the number of users/traffic volume in an area at a first predetermined horizontal angle and a first predetermined vertical angle is large, and the number of users/traffic volume in an area at a second predetermined horizontal angle and a second predetermined vertical angle is small. Based on this, the traffic requirement determining unit 250 may be used to determine traffic requirements of the user, where the traffic requirements here include traffic flow and/or service quality (QoS) requirements. The user grouping unit 210 may dynamically adjust, based on the traffic requirements determined by the traffic requirement determining unit 250, space user groups statically grouped based on the spatial position information measured by the spatial position information measuring unit 240, and thus dynamic grouping is realized, so that spatial positions of users in respective dynamic groups are close to each other and traffic loads of the respective dynamic groups are balanced. The static grouping here may be understood as that: each space user grouping operation is performed based on a fixed rule/manner, for example, grouping according to a predetermined horizontal angle and a predetermined vertical angle (for example, the number of groups/the space area range corresponding to each group does not change), or grouping according to the geographical position all the time. Accordingly, the dynamic grouping may be understood as that: each space user grouping operation may be performed based on different rules/manners according to specific network environments and traffic requirements. For example, in a case that there are multiple predetermined horizontal angles and predetermined vertical angles, different user grouping is performed by selecting different grouping ways each time (for example the number of groups/the space area range corresponding to each group may change), or the grouping is performed by considering different factors. For example, the grouping is performed by only considering the geographical position in a case that the traffic load is light; and the grouping is performed by further considering the traffic load condition in a case that the traffic load is high.

In addition, in an optional example, dynamic grouping may be performed at an initial phase and static grouping is omitted. For example, users close to each other in spatial positions are gathered into clusters, each cluster functions as one user group, and an area at a horizontal angle and a vertical angle corresponding to the cluster functions as a part of the group configuration information. For example, traffic loads and channel correlation degrees and so on are considered, so that users in the same user group are close to each other and have a high channel correlation degree, while users in different user groups are far away from each other and have a low channel correlation degree, and overall traffic loads of respective user groups are balanced.

Resource scheduling based on the user grouping of the present disclosure, can reduce interference between users. Interacting with the neighbor cell on the grouping information can reduce a possibility that users at an edge of the cell suffer interference from users in other cells. In addition, the traffic load and so on is further considered, so that the overall load of the cell is uniformly distributed in respective user groups, and certain fairness and resource reusing efficiency are ensured.

Figure 3:
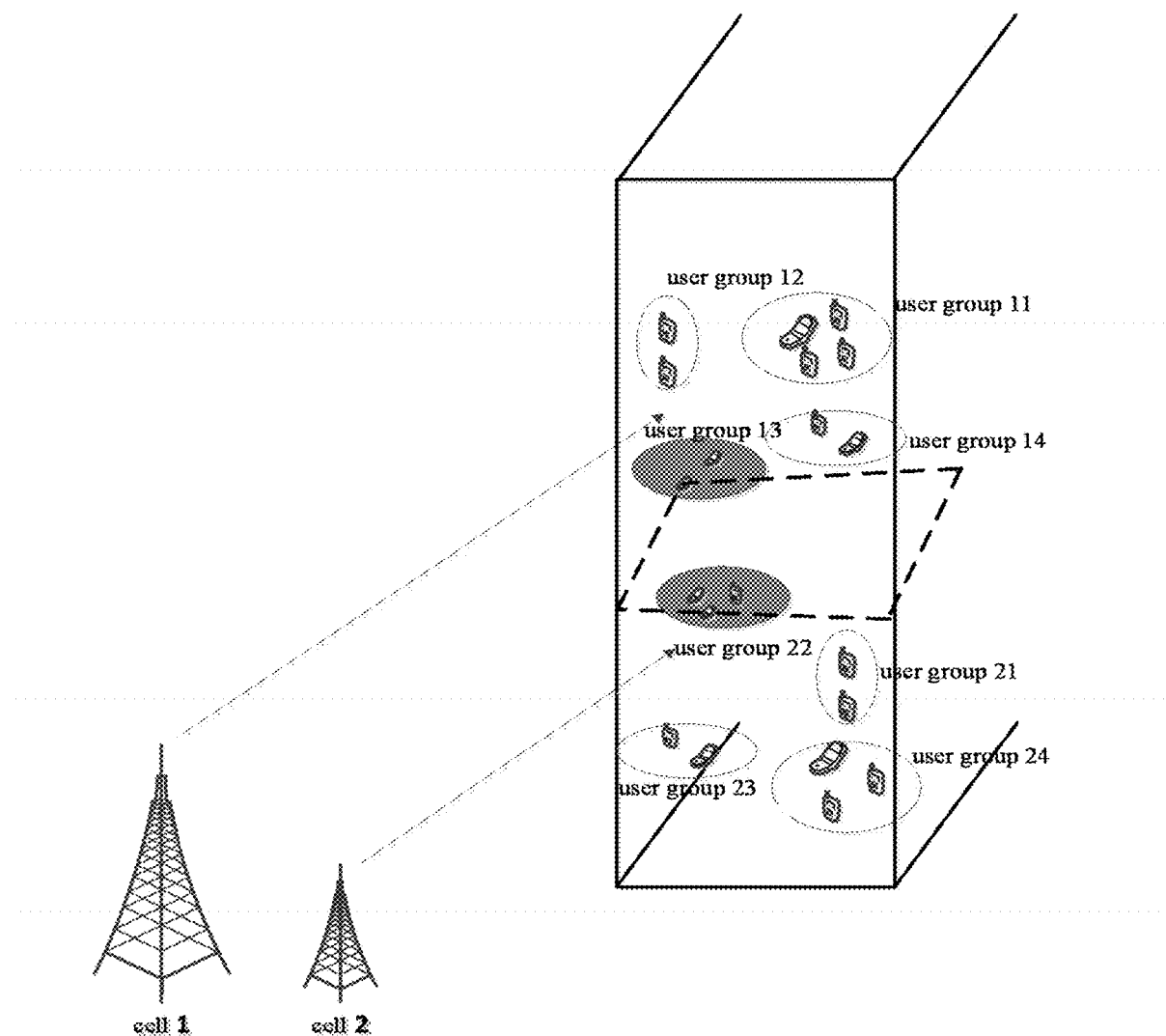
FIG. 3 shows a schematic diagram of grouping of space users in two adjacent cells according to a specific embodiment of the present disclosure.

FIG. 3 shows a schematic diagram of static grouping of space users in two adjacent cells according to a specific embodiment of the present disclosure.

As shown in FIG. 3, a cell 1 and a cell 2 each has 10 users. According to spatial position information and the principle of static grouping, space users in the cell 1 are grouped into a user group 11 including 4 users, a user group 12 including 2 users, a user group 13 including 2 users and a user group 14 including 2 users; and space users in the cell 2 are grouped into a user group 21 including 2 users, a user group 22 including 3 users, a user group 23 including 2 users and a user group 24 including 3 users.

Specifically, for 10 space users UE1-1, UE1-2, . . . , UE1-10 of the cell 1, the spatial position information measuring unit 240 measures a vertical arrival angle and a horizontal arrival angle of the 10 space users respectively, and the traffic requirement determining unit 250 measures a dynamic traffic volume of the 10 space users respectively, as shown in the following table.

| user number | vertical arrival angle | horizontal arrival angle | traffic requirement flow (bps) |
| --- | --- | --- | --- |
| UE1-1 | 12 | 25 | 500 |
| UE1-2 | 25 | 40 | 200 |
| UE1-3 | 30 | 35 | 100 |
| UE1-4 | 40 | 45 | 300 |
| UE1-5 | 45 | 95 | 200 |
| UE1-6 | 50 | 106 | 200 |
| UE1-7 | 155 | 20 | 400 |
| UE1-8 | 160 | 35 | 300 |
| UE1-9 | 165 | 95 | 400 |
| UE1-10 | 110 | 125 | 400 |

As shown in FIG. 3, the 10 users of the cell 1 are grouped into 4 user groups according to a range of the horizontal arrival angles and the vertical arrival angles. That is, users UE-1, UE1-2, UE1-3 and UE1-4 having a horizontal arrival angle within [0, 90] and a vertical arrival angle within [0, 90] are grouped into the user group 11, users UE1-5 and UE1-6 having a horizontal arrival angle within [90, 180] and a vertical arrival angle within [0, 90] are grouped into the user group 12, users UE1-7 and UE1-8 having a horizontal arrival angle within [0,90] and a vertical arrival angle [90, 180] are grouped into the user group 13, and users UE1-9 and UE1-10 having a horizontal arrival angle within [90, 180] and a vertical arrival angle [90, 180] are grouped into the user group 14.

Figure 4:
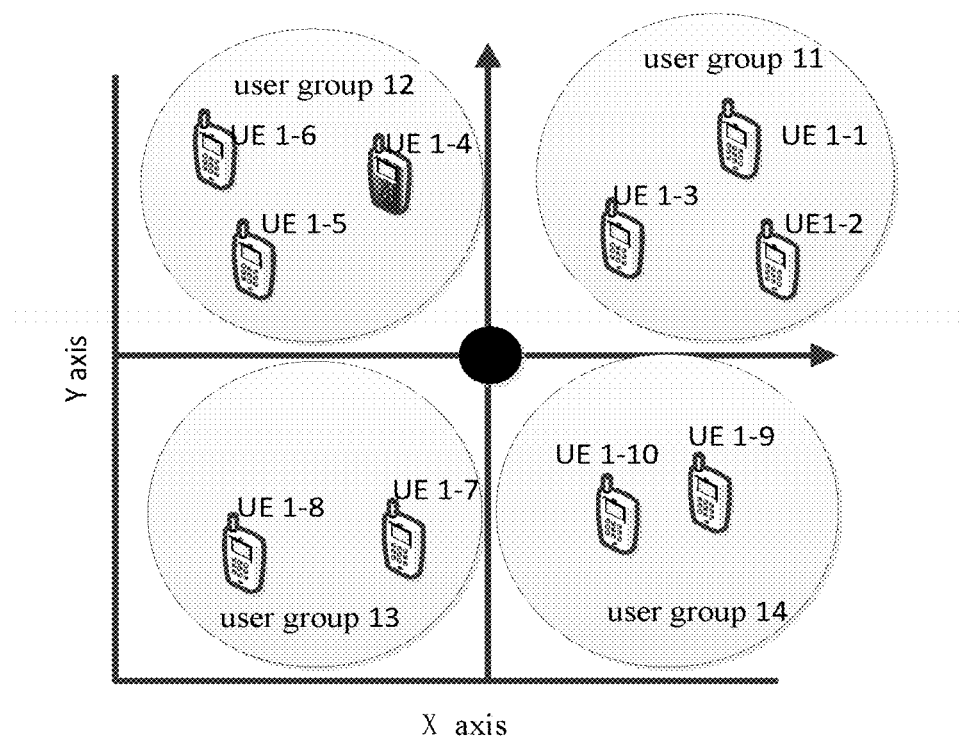
FIG. 4 shows a schematic diagram of grouping of space users in a cell which is dynamically adjusted according to a specific embodiment of the present disclosure.

In addition, it may be seen from traffic requirements of respective space users listed in the above table that, a sum of traffic requirement flow of the user group 11 including 4 users UE-1, UE1-2, UE1-3 and UE1-4 is 1100 bps, a sum of traffic requirement flow of the user group 12 including users UE1-5 and UE1-6 is 400 bps, a sum of traffic requirement flow of the user group 13 including users UE1-7 and UE1-8 is 700 bps, and a sum of traffic requirement flow of the user group 14 including users UE1-9 and UE1-10 is 800 bps. Obviously, the traffic requirements of the user group 11 and the user group 12 is significantly different from traffic requirements of other user groups. Therefore, the user UE1-4 in the user group 11 may be adjusted into the user group 12, so that traffic requirement flow of respective user groups each is about 700 bps, to balance the flow. FIG. 4 shows a schematic diagram of grouping of space users in a cell 1 which is dynamically adjusted.

In addition, for the QoS similar processing may be performed. For example, users with a high QoS requirement are distributed into multiple user groups as much as possible, so that the overall QoS requirements of respective user groups are substantially close to each other, which is not described in detail here.

It should be noted here that the dynamic adjusting is not necessary. That is, the communication apparatus according to the embodiment may not include the traffic requirement determining unit 250, and accordingly, the user grouping unit 210 does not dynamically adjust space users statically grouped according to the traffic requirements.

In addition, as mentioned above, in another example of the present disclosure, users may be grouped statically and/or dynamically according to channel correlation. Similar to an idea of grouping according to the spatial position, if multiple users with high channel correlation are scheduled by using the same or close time frequency resource, it is easy to generate severe interference among the multiple users. Therefore, it is expected to schedule one of the multiple uses with high channel correlation each time by using the 3D beamforming technology, for example. Specifically, a channel matrix $H_1$ from a base station to UE1 and a channel matrix $H_2$ from the base station to UE2 may be determined firstly, and then a value $H_1H_2^H$ of channel correlation between the UE1 and the UE2 is obtained to determine a channel correlation degree of the two users UE1 and UE2 and set a threshold value. If the value of the channel correlation of the users is less than the set threshold value, the users may be grouped into a same space user group.

In addition, processing in the group configuration information determining unit 220 and the notifying unit 230 of the communication apparatus according to the embodiment is similar to processing in the group configuration information determining unit 120 and the notifying unit 130 of the communication apparatus according to the first embodiment respectively, which is not described in detail here.

Similarly, the communication apparatus for performing wireless communication in a wireless communication system according to the embodiment can also notify the neighbor cell of the group configuration information of the users in the 3D beamforming space of the current cell, thereby facilitating interference coordination between adjacent cells and being beneficial to optimize network scheduling.

It should be noted that, in the present disclosure, the grouped users in the 3D beamforming space may be all or a part of users in the cell. In a preferred example, space user grouping, resource scheduling and 3D beamforming are performed on only users located at an edge of the cell, and other users may process according to the existing resource scheduling or anti-interference way without interacting with the neighbor cell information on other users. Alternatively, space user grouping, resource scheduling and 3D beamforming are performed on all the users, but only user grouping related to the edge users is interacted with the neighbor cell. The edge users may be determined according to the existing ways, for example the geographical position and signal and interference to noise ratio, which is not described in detail here. In the preferred example, signaling overhead between cells can be reduced, and system complexity can be reduced.

Figure 5:
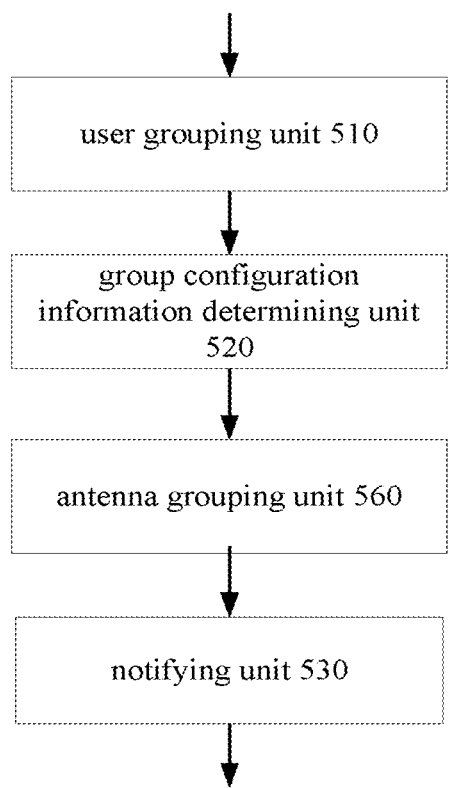
FIG. 5 shows a block diagram of a structure of a communication apparatus according to a third embodiment of the present disclosure.

In addition, in order to cause multiple antennae to serve for respective user groups reasonably, pilot design before Rel-12 is reused simultaneously, thereby reducing the overhead of the reference signal and grouping physical antennae in an antenna array of the current cell. FIG. 5 shows a block diagram of a structure of a communication apparatus according to a third embodiment of the present disclosure and based on the conception.

Presently, a base station supports configurations of 1, 2, 4 and 8 transmission antennae, and there is a design pattern corresponding to a reference signal for each antenna configuration, so that a terminal performs channel measurement for each downlink physical antenna by a corresponding reference signal. An antenna port refers to a logic port for transmission, and different antenna ports correspond to design patterns of different types of reference signals in different antenna configurations. The antenna port is defined from a point of a receiver, that is, if the receiver needs to distinguish difference of resources spatially, multiple antenna ports need to be defined, there is not an absolute one-to-one-correspondence between the antenna ports and the physical transmission antennae. For the UE, a received reference signal corresponding to a certain antenna port defines the corresponding antenna port, although the reference signal may be combined by signals transmitted by multiple physical antennae. In which, CRS supports multiple configurations including 1 transmission antenna (for example an antenna port 0), 2 transmission antennae (for example antenna ports 0 and 1) or 4 transmission antennae (for example antenna ports 0-3), and the CRS is transferred on a transmission antenna according to patterns of the antenna port. CSI-RS supports multiple configurations including 1 transmission antenna (for example an antenna port 15), 2 transmission antennae (for example antenna ports 15 and 16), 4 transmission antennae (for example antenna ports 15-18) or 8 transmission antennae (for example antenna ports 15-22), and the CSI-RS is transferred on the transmission antenna according to patterns of the antenna port. Specifically, the CRS has the following objects: (1) downlink channel quality measurement; and (2) downlink channel estimation, for coherent detection and demodulation of a UE end, the CRS is transmitted to all users in the cell; hence in a case of transmitting using multiple antennae, it needs to give consideration to reception capability of UEs with various versions and reduce system complexity/overhead of transmitting the CRS. In addition, as described above, PDCCH is a control channel for allocating resources for other channels including PDSCH, the PDDCH is shared by multiple UEs, and the UE needs to monitor the PDCCH to know resources where a PDSCH carrying data information of the UE is located. Therefore, the PDCCH is transmitted to multiple users, and it needs to give consideration to reception capability of UEs with various versions and reduce system complexity/overhead of transmitting the PDCCH. In another aspect, the CSI-RS is also used to estimate a downlink channel by UE with a version above a version 10. For example, in a case that there are many UEs with a version above the version 10, high system complexity and overhead due to transmitting CSI-RS using multiple antennae may be considered, and thus utilizing the solution for antenna grouping according to the present disclosure. Hereinafter a communication apparatus according to a third embodiment of the present disclosure is illustrated by taking the CRS as an example of a reference signal.

As shown in FIG. 5, the communication apparatus according to the third embodiment of the present disclosure includes a user grouping unit 510, a group configuration information determining unit 520, a notifying unit 530 and an antenna grouping unit 560.

Processing of the user grouping unit 510 and the group configuration information determining unit 520 is similar to processing of the user grouping unit and the group configuration information determining unit in the communication apparatus according to the embodiments described above respectively, which is not described in detail here.

In addition, in the embodiment, the antenna grouping unit 560 groups multiple physical antennae in an antenna array provided for a current cell into multiple antenna groups according to configuration information of cell transmission antennae and group configuration information of users determined by the group configuration information determining unit 520. Here, each antenna group may include N antennae, where $N=2^n$ and n is non-negative integer.

In some examples, the communication apparatus may not include the user grouping unit 510 and the group configuration information determining unit 520. The antenna grouping unit 560 groups antennae according to a predetermined rule. For example, all the physical antennae are grouped into the predetermined number of antenna groups, or each antenna group includes the fixed number of physical antennae, for example 8, that is, n physical antennae are grouped into n/8 antenna groups.

In another example, the antenna grouping unit 560 may group antennae according to a predetermined rule firstly, then the user grouping unit 510 groups users in the cell into the same number of user groups as the number of antenna groups, and each antenna group servers for one user group.

Figure 6:
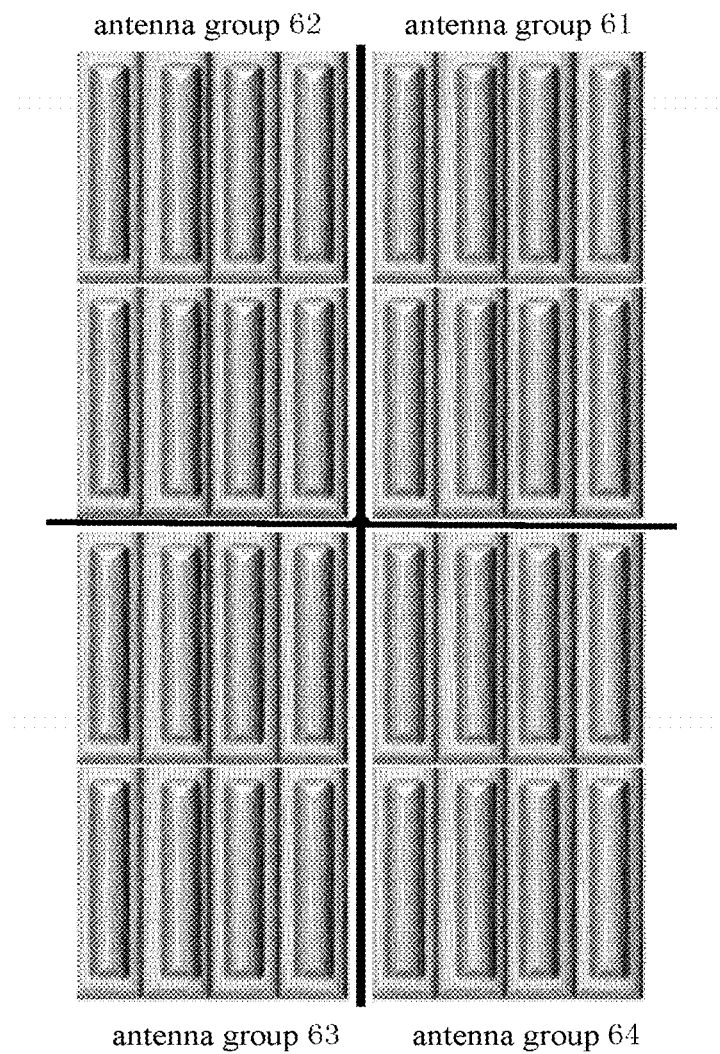
FIG. 6 and FIG. 7 show schematic diagrams of grouping of an antenna array including 32 physical antennae and an antenna array including 64 physical antennae according to an embodiment of the present disclosure, respectively.
Figure 7:
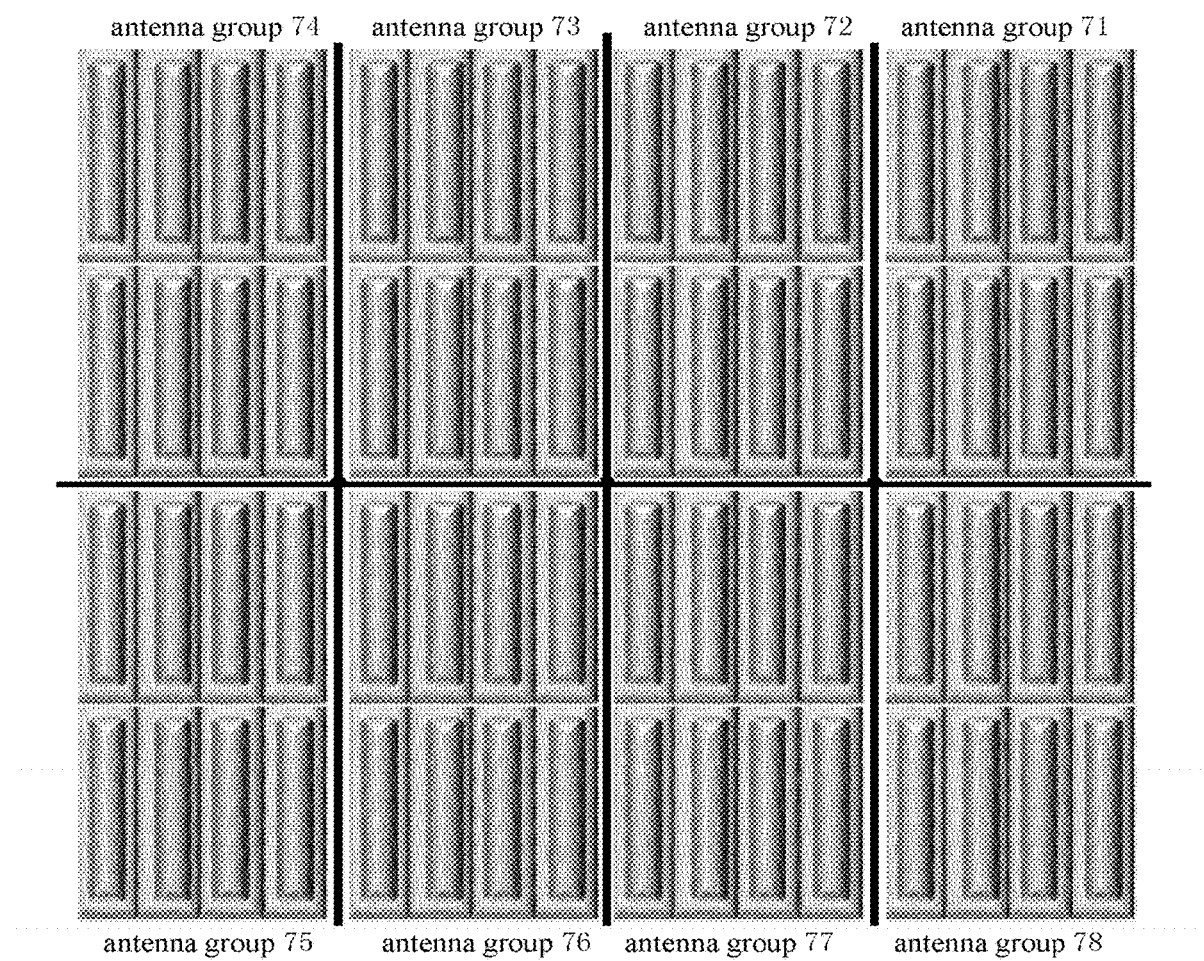

FIG. 6 and FIG. 7 show schematic diagrams of grouping of an antenna array including 32 physical antennae and an antenna array including 64 physical antennae according to an embodiment of the present disclosure respectively. As shown in FIG. 6, the antenna array including 32 physical antennae may be grouped into an antenna group 61, an antenna group 62, an antenna group 63 and an antenna group 64 each including 8 physical antennae. In FIG. 7, the antenna array including 64 physical antennae is grouped into an antenna group 71, an antenna group 72, an antenna group 73, an antenna group 74, an antenna group 75, an antenna group 76, an antenna group 77 and an antenna group 78 each including 8 physical antennae.

After the antenna grouping unit 560 groups antennae in an antenna array of a current cell, the notifying unit 530 (for example, in addition to notifying the neighbor cell of group configuration information of users in the 3D beamforming space of the current cell, described in the above embodiments) further notifies the neighbor cell of transmission modes of a physical downlink control channel (PDCCH) and/or a common reference signal (CRS) of the current cell on the antenna array.

Specifically, the transmission modes of the physical downlink control channel (PDCCH) and/or the common reference signal (CRS) may include at least one of the following transmission modes: a mode in which all antenna groups transmit the physical downlink control channel (PDCCH) and/or the common reference signal (CRS); a mode in which only antenna groups transmitting a physical downlink shared channel (PDSCH), a demodulation reference signal (DMRS) and/or a channel state information reference signal (CSI-RS) transmit the physical downlink control channel (PDCCH) and/or the common reference signal (CRS); a mode in which only one fixed antenna group transmits the physical downlink control channel (PDCCH) and/or the common reference signal (CRS); and a mode in which the physical downlink control channel (PDCCH) and/or the common reference signal (CRS) is transmitted on multiple fixed antennae in the antenna array.

After determining the transmission modes of the physical downlink control channel (PDCCH) and/or common reference signal (CRS), the antenna array of the current cell may transmit the physical downlink control channel (PDCCH) and/or the common reference signal (CRS) according to the transmission modes.

For antenna groups transmitting the physical downlink control channel (PDCCH) and/or the common reference signal (CRS), 1/2/4 antennae may be selected from the antenna group including N antennae to transmit the physical downlink control channel (PDCCH) and/or the common reference signal (CRS), the remaining N−1/N−2/N−4 antennae copy transmission contents of the 1/2/4 antennae to obtain a diversity gain or keep silence, so that no signal is transmitted on the remaining antennae. In this case, even if all antenna groups transmit the physical downlink control channel (PDCCH) and/or the common reference signal (CRS), only a part of antennae in each antenna group may be used to transmit the PDCCH and/or the CRS, thereby reducing system complexity and overall energy overhead of the control signal/reference signal.

For example, in a case that a certain antenna group including 8 antennae 1, 2, . . . ,8 functions as the antenna group transmitting the physical downlink control channel (PDCCH) and/or the common reference signal (CRS), the 8 antennae may be randomly grouped into four sub-groups, for example {1, 3}, {2, 4}, {5, 6} and {7, 8}. If the antennae 1 and 3 are fixed to transmit the physical downlink control channel (PDCCH) and/or the common reference signal (CRS), pre-coding is performed so that the physical downlink control channel (PDCCH) and/or the common reference signal (CRS) is transmitted by the antennae 1 and 3 each time. Two antennae in the remaining three antenna sub-groups {2, 4}, {5, 6} and {7, 8} copy transmission contents of the antennae 1 and 3 respectively to obtain a diversity gain, or antennae in the remaining three antenna sub-groups keep silence so that no signal is transmitted on these antennae. Practically, the "fix" may be semi-static, i.e., the transmission antennae may change after a certain period of time. The 8 antennae in the antenna group may be grouped newly, and the physical downlink control channel (PDCCH) and/or the common reference signal (CRS) is transmitted by two antennae in another sub-group obtained by grouping newly. In an example, it needs to notify the neighbor cell of the number of transmission antennae and the degree of transmission diversity used by the physical downlink control channel (PDCCH) and/or the common reference signal (CRS), so that the neighbor cell determines a using way of transmission diversity of its PDCCH and CRS, thereby determining a boundary of the cell for example.

In addition, a case that the physical downlink control channel (PDCCH) and/or the common reference signal (CRS) is transmitted on multiple fixed antennae in an antenna array is described. For example, an antenna array including 32 antennae 1, 2, . . . , 32 is grouped into four antenna groups {1, 3, 9, 10, 17, 18, 19, 20}, {2, 4, 11, 12, 21, 22, 23, 24}, {5, 6, 13, 14, 25, 26, 27, 28} and {7, 8, 15, 16, 29, 40, 31, 32}. If the antennae 1 and 5 are fixed to transmit the physical downlink control channel (PDCCH) and/or the common reference signal (CRS), a pre-coding is performed so that the physical downlink control channel (PDCCH) and/or the common reference signal (CRS) may be transmitted by the antennae 1 and 5 in different antenna groups each time. Similarly, the "fix" may also be semi-static, i.e., the transmission antennae may change after a certain period of time. The physical downlink control channel (PDCCH) and/or the common reference signal (CRS) is transmitted by another several antennae. In an example, it needs to notify the neighbor cell of the number of transmission antennae and the degree of transmission diversity used by the physical downlink control channel (PDCCH) and/or the common reference signal (CRS), so that the neighbor cell determines a using way of transmission diversity of its PDCCH and CRS, thereby determining a boundary of the cell for example.

In addition, after the user grouping unit 510 groups the users in the 3D beamforming space of the current cell and the antenna grouping unit 560 groups multiple physical antennae in the antenna array according to the group configuration information of the users determined by the group configuration information determining unit 520, respective antenna groups may provide data transmission service to corresponding space user groups. In this case, in a physical downlink shared channel (PDSCH), one antenna group sends only one wave beam to one user in each space user group.

It should be further noted here, both a difference in a horizontal angle and a difference in a vertical angle among users in different space user groups scheduled simultaneously on a same block of time frequency resource should be larger than a predetermined threshold value; or angles of connection lines formed between the antenna and users in different groups scheduled simultaneously on a same block of time frequency resource should be larger than a predetermined threshold value. Otherwise, re-scheduling is to be performed.

In addition, in order to perform interference coordination, an active antenna group and a silent antenna group may be defined. The active antenna group may send a wave beam on a corresponding resource block (RB), and the silence antenna group sends no wave beam. Finally, after each space user group schedules one user and if a certain user or some users has particular requirements (for example particular QoS or flow requirements), wave beam transmission schemes for the physical downlink shared channel (PDSCH) of the antenna group may be adjusted. For example, similar PDCCH and CRS transfer the transmission diversity in a same antenna group; further, if there are remaining antenna groups, the transmission diversity may be transmitted in different antenna groups.

The communication apparatus for performing wireless communication in a wireless communication system according to the embodiment groups the multiple physical antennae in the antenna array provided for the current cell, and can reuse pilot design before Rel-12, thereby reducing overhead of the reference signal.

Figure 8:
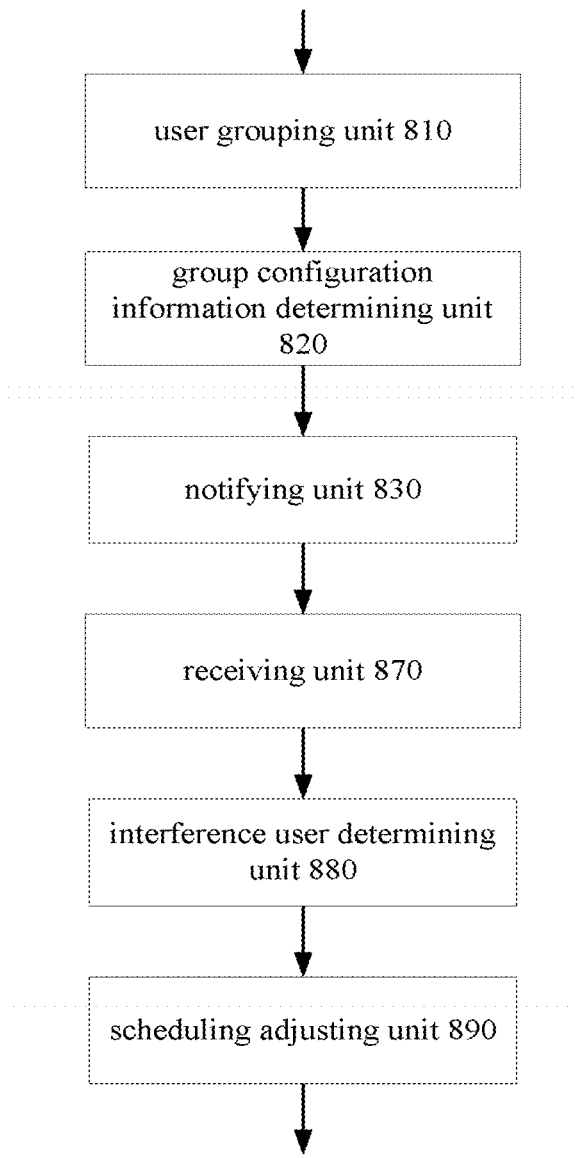
FIG. 8 shows a block diagram of a structure of a communication apparatus according to a fourth embodiment of the present disclosure.

In the various embodiments above, the neighbor cell may schedule accordingly based on the received group configuration information of the users in the 3D beamforming space of the current cell, thereby avoiding interference between adjacent cells. In addition, the current cell may receive group configuration information of users in a 3D beamforming space of a neighbor cell, and adjust the scheduling of the space users in the current cell. FIG. 8 shows a block diagram of a structure of a communication apparatus according to a fourth embodiment of the present disclosure and based on the concept.

As shown in FIG. 8, the communication apparatus according to the fourth embodiment of the present disclosure includes a user grouping unit 810, a group configuration information determining unit 820, a notifying unit 830, a receiving unit 870, an interference user determining unit 880 and a scheduling adjusting unit 890.

Processing of the user grouping unit 810, the group configuration information determining unit 820 and the notifying unit 830 is similar to processing of the user grouping unit, the group configuration information determining unit and the notifying unit in the communication apparatus according to the embodiments described above respectively, which is not described in detail here.

The receiving unit 870 receives group configuration information of users in a 3D beamforming space of a neighbor cell. The interference user determining unit 880 determines, according to the group configuration information of the neighbor cell received by the receiving unit 870, a space user group in the neighbor cell which interferes with the current cell and a space user group in the current cell which interferes with the neighbor cell. The scheduling adjusting unit 890 adjusts scheduling of users in the space user group in the current cell which interferes with the neighbor cell and requires the neighbor cell to adjust scheduling of users interfering with the current cell for example, according to a determination result of the interference user determining unit 880.

Specifically, if a difference between a horizontal angle $\alpha_i$ of a user in the current cell and a horizontal angle $\alpha_j$ of a user in the neighbor cell and a difference between a vertical angle $\beta_i$ of a user in the current cell and a vertical angle $\beta_j$ of a user in the neighbor cell are less than a predetermined threshold value, the interference user determining unit 880 determines that a space user group where the user of the current cell is located is the space user group interfering with the neighbor cell. In this case, the adjusting scheduling of users in the space user group of the current cell which interferes with the neighbor cell by the scheduling adjusting unit 890 includes: re-scheduling and ensuring that the re-scheduling does not schedule the users in the current cell on resources used by the interference space user group.

In addition, in the communication apparatus according to the embodiment, the notifying unit 830 further notifies the neighbor cell of a potential interference space user group in the cell and its scheduling resources which are limited to use after the scheduling adjusting unit 890 adjusts. On this point, it is not shown in FIG. 8.

The communication apparatus for performing wireless communication in a wireless communication system according to the embodiment can not only notify the neighbor cell of the group configuration information of the users in the 3D beamforming space of the current cell in a timely manner, but also adjust scheduling of the users in the current cell according to the group configuration information of the users in the 3D beamforming space of the neighbor cell in a timely manner and notify the neighbor cell of the adjusted scheduling result, thereby facilitating interference coordination between adjacent cells and being beneficial to optimize network scheduling.

Figure 9:
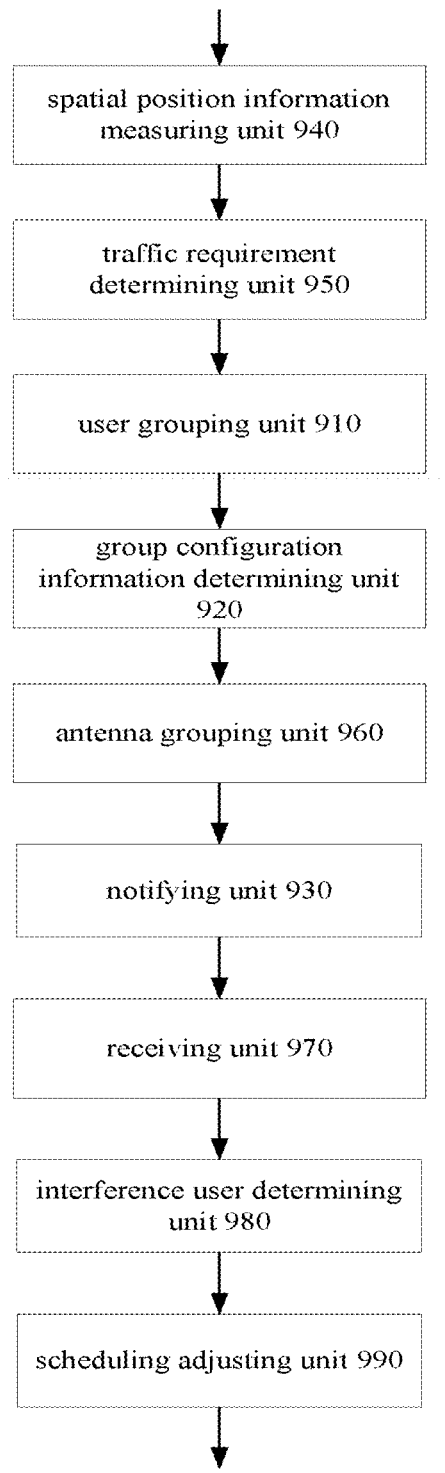
FIG. 9 shows a block diagram of a structure of a communication apparatus according to a fifth embodiment of the present disclosure.

The communication apparatus which can achieve interference coordination between adjacent cells or can reduce overhead of the reference signal are described respectively in various embodiments above. FIG. 9 shows a block diagram of a structure of a communication apparatus according to a fifth embodiment of the present disclosure which can both achieve interference coordination between adjacent cells and reduce overhead of the reference signal.

As shown in FIG. 9, the communication apparatus according to the fifth embodiment of the present disclosure includes a user grouping unit 91, a group configuration information determining unit 920, a notifying unit 930, a spatial position information measuring unit 940, a traffic requirement determining unit 950, an antenna grouping unit 960, a receiving unit 970, an interference user determining unit 980 and a scheduling adjusting unit 990.

Processing of the user grouping unit 910, the group configuration information determining 920, the notifying unit 930, the spatial position information measuring unit 940, the traffic requirement determining unit 950, the antenna grouping unit 960, the receiving unit 970, the interference user determining unit 980 and the scheduling adjusting unit 990 according to the embodiment is similar to processing of the user grouping unit, the group configuration information determining unit, the notifying unit, the spatial position information measuring unit, the traffic requirement determining unit, the antenna grouping unit, the receiving unit, the interference user determining unit and the scheduling adjusting unit in the communication apparatus according the embodiments described above respectively, which is not described in detail here.

The communication apparatus for performing wireless communication in a wireless communication system according to the embodiment can notify the neighbor cell of the group configuration information of the users in the 3D beamforming space of the current cell in a timely manner, thereby facilitating interference coordination between adjacent cells and being beneficial to optimize network scheduling.

The communication apparatus for performing wireless communication in a wireless communication system according to the embodiment can further group the multiple physical antennae in the antenna array provided for the current cell and can reuse pilot design before Rel-12, thereby reducing overhead of the reference signal.

In addition to notifying the neighbor cell of the group configuration information of the users in the 3D beamforming space of the current cell in a timely manner, the communication apparatus for performing wireless communication in a wireless communication system according to the embodiment can further adjust the scheduling of the users in the current cell according to the group configuration information of the users in the 3D beamforming space of the neighbor cell in a timely manner and notify the neighbor cell of the adjusted scheduling result, thereby facilitating interference coordination between adjacent cells and being beneficial to optimize network scheduling.

The structure block diagram and working principles of the communication apparatus according to the embodiments of the present disclosure are described in conjunction with the drawings. However, it should be noted that, specific examples of the communication apparatus according to the present disclosure are not limited to several examples described above, and these embodiments may be combined, decomposed, adjusted and changed in any way. For example, the communication apparatus according to the second embodiment and the communication apparatus according to the third embodiment and/or the fourth embodiment described above may be combined, and the communication apparatus according to the third embodiment and the communication apparatus according to the fourth embodiment described above may be combined and so on, and the variation embodiments each fall within the scope of protection of the present disclosure.

It should be noted here that, the communication apparatus is described in detail in the various embodiments above by taking 3D beamforming as an example, but the present disclosure is not limited to the 3D beamforming and the related principle and device of the present disclosure may be extended to the conventional beamforming (not considering a height) to perform interference coordination. It is easy for those skilled in the art to simplify 3D into 2D, which is not described in detail here.

In addition, it should be further noted here that, the user mentioned in the above description refers to user equipment used by the user, for example a mobile terminal, a mobile station or a vehicle/intelligent device with a wireless communication function.

Figure 10:
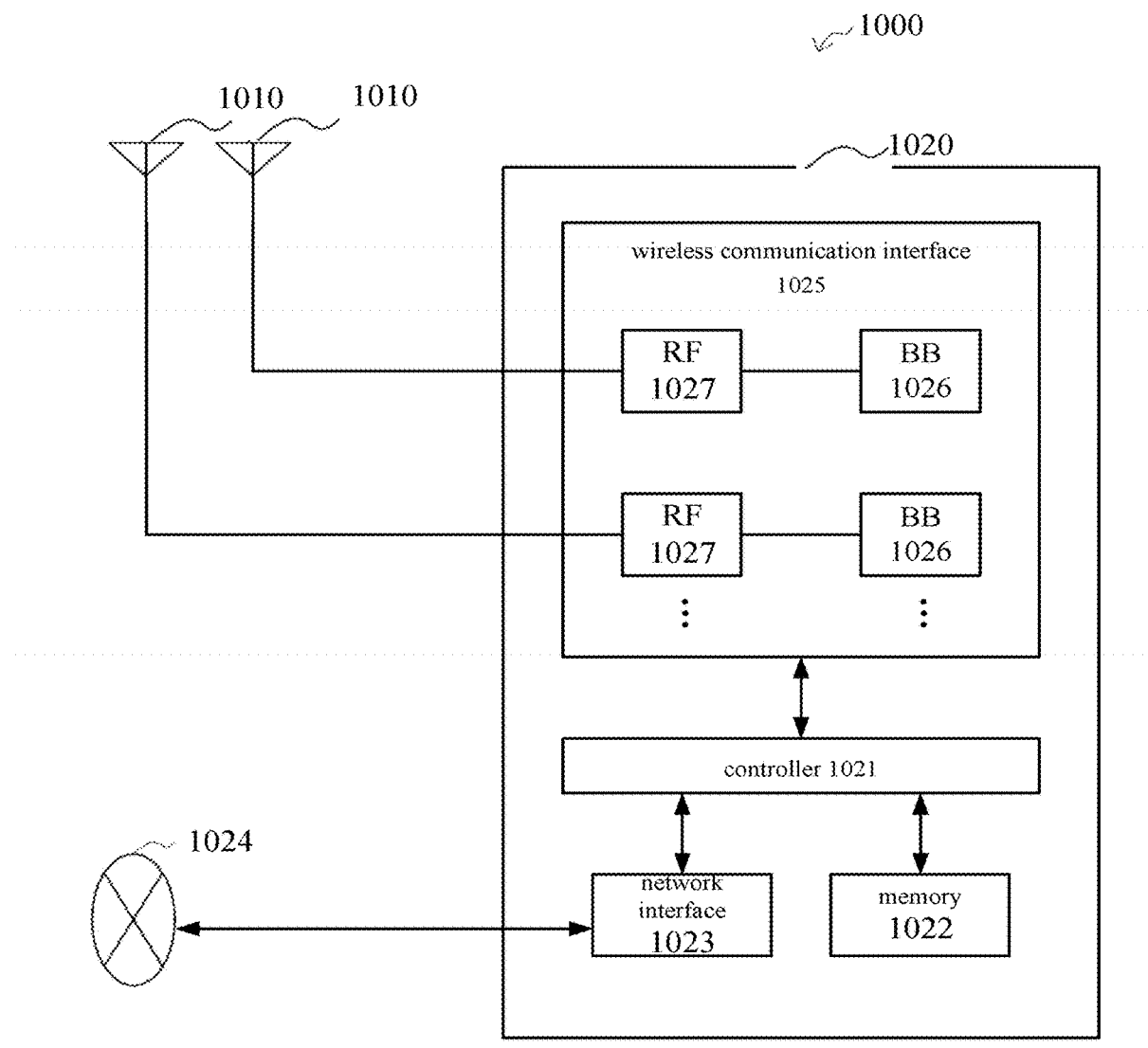
FIG. 10 shows a exemplary block diagram of a schematic configuration of an eNB to which the technology of the present disclosure may be applied.

In addition, it should be noted here that, the communication apparatus mentioned in the above description may be a communication chip or an e-node Base (eNB) base station and so on. FIG. 10 shows an exemplary block diagram of a schematic configuration of an eNB to which the technology in the content of the present disclosure may be applied.

As shown in FIG. 10, an eNB 1000 includes one or more antennae 1010 and a base station device 1020. Each antenna 1010 may be connected to the base station device 1020 via radio frequency (RF) cable.

Each of the antennae 1010 includes one or more antenna elements (for example multiple antenna elements included in a multiple input multiple output (MIMO) antenna) and is used by the base station device 1020 to transmit and receive a wireless signal. As shown in FIG. 10, the eNB 1000 may include multiple antennae 1010. For example, the multiple antennae 1010 may be compatible with multiple frequency bands used by the eNB 1000. Although FIG. 10 shows an example in which the eNB 1000 includes multiple antennae 1010, the eNB 1000 may include a single antenna 1010.

The base station device 1020 includes a controller 1021, a memory 1022, a network interface 1023 and a wireless communication interface 1025.

The controller 1021 may be a central processing unit (CPU) or a digital signal processor (DSP) and control various types of functions of a higher layer of the base station 1020. For example, the controller 1021 generates a data packet according to data in a signal processed by the wireless communication interface 1025, and transfers the generated packet via the network interface 1023. The controller 1021 may bundle data from multiple base band processors to generate a bundle packet and transfer the generated bundle packet. The controller 1021 may have the logic function to perform the following control: radio resource control, wireless bearing control, mobility management and admission control and scheduling, for example.

Specifically, in conjunction with the communication apparatus according to the fifth embodiment of the present disclosure described in FIG. 9, for example, the controller 1021 may be implemented as the spatial position information measuring unit 940 to measure spatial position information of users in a 3D beamforming space according to uplink channel sounding information and/or satellitic geographical position information of an auxiliary global navigation satellite system (A-GNSS), and is implemented as a traffic requirement determining unit 950 to determine traffic requirements of a user, where the traffic requirements include traffic flow and/or service quality (QoS) requirements.

The controller 1021 may also be implemented as the user grouping unit 910 to group the users statically and/or dynamically according to the spatial position information and/or traffic requirements of the users, and group users in the 3D beamforming space of the current cell into multiple space user groups. In a case of grouping statically, users in an area at a predetermined horizontal angle and a predetermined vertical angle in the 3D beamforming space may be grouped into one space user group. In a case of grouping dynamically, it is ensured that spatial positions of users in respective dynamic groups are close to each other and traffic loads of the respective dynamic groups are unbalanced as much as possible. Practically, as described above, here the users may be grouped statically and/or dynamically in combination with or independently based on channel correlation between UEs.

The controller 1021 may function as the group configuration information determining unit 920 to determine group configuration information of users in a 3D beamforming space of a current cell. The controller 1021 may further function as the antenna grouping unit 960 to group multiple physical antennae into multiple antenna groups according to configuration information of cell transmission antennae and the group configuration information of the users. Each antenna group includes N antennae, where $N=2^n$ and n is a non-negative integer.

The controller 1021 may function as a part of the notifying unit 930, so that the neighbor cell is notified of, via the antenna 1010 and the wireless communication interface 1025 described in the following, the group configuration information of the users in the 3D beamforming space of the current cell and transmission modes of the physical downlink control channel (PDCCH) and/or the common reference signal (CRS) of the current cell on the antenna array.

The controller 1021 may function as a part of the receiving unit 970, so that the group configuration information of the users in the 3D beamforming space of the neighbor cell is received via the antenna 1010 and the wireless communication interface 1025 described in the following. In addition, the controller 1021 may be implemented as the interference user determining unit 980 to determine, according to the received group configuration information of the neighbor cell, a space user group in the neighbor cell which interferes with the current cell and a space user group in the current cell which interferes with the neighbor cell. The controller 1021 may function as the scheduling adjusting unit 990 to adjust scheduling of users in the space user group of the current cell which interferes with the neighbor cell and/or require the neighbor cell to adjust scheduling of users interfering with the current cell for example.

In addition, as described above, when the controller 1021 functioning as the interference user determining unit 980 determines that there is a space user group in the current cell which interferes with the neighbor cell, the controller 1021 functioning as the scheduling adjusting unit 990 may re-schedule and ensure that the re-scheduling does not schedule users in the current cell on resources used by users in the space user group interfering with the neighbor cell, and the controller 1021 functioning as a part of the notifying unit 930 may coordinate with the antenna 1010 and the wireless communication interface 1025 described in the following to notify the neighbor cell of a potential space user group in the current cell which interferes with the neighbor cell and its scheduling resources which are limited to use.

In addition, it should be noted that, functions performed when the above-described control or controllers 1021 are implemented as respective separate units may be performed in combination with eNB or a core network node nearby.

The memory 1022 includes a random access memory (RAM) and a read only memory (ROM), and stores programs to be executed by the controller 1021 and various types of control data (for example a terminal list, transmission power data and scheduling data).

The network interface 1023 is a communication interface for connecting the base station device 1020 to a core network 1024. The controller 1021 may communicate with the core network node or another eNB via the network interface 1023. For example, the neighbor cell is notified of relative information on the current cell, such as group configuration information and scheduling information of space users. In this case, the eNB 1000 may be connected to the core network node or other eNBs via a logic interface (such as an S1 interface or an X2 interface). The network interface 1023 may be a wired communication interface or a wireless communication interface for a wireless backhaul line. If the network interface 1023 is a wireless communication interface, the network interface 1023 may use a higher frequency band than a frequency band used by the wireless communication interface 1025 for wireless communication.

The wireless communication interface 1025 supports any cellular communication scheme (for example long term evolution (LTE) and LTE-Advance), and provides wireless connection with a terminal located in a cell of the eNB 1000 via the antenna 1010. The wireless communication interface 1025 may generally include a base band (BB) processor 1026 and an RF circuit 1027 for example. The BB processor 1026 may perform coding/decoding, modulating/demodulating and multiplexing/demultiplexing for example, and perform various types of signal processing of a layer (for example L1, medium access control (MAC), radio link control (RLC) and packet data convergence protocol (PDCP)). The BB processor 1026 may have a part or all of the logic functions described above instead of the controller 1021. The BB processor 1026 may be a memory storing communication control programs or a module including a processor configured to execute the programs and related circuits. Updating the programs may change functions of the BB processor 1026. The module may be a card or blade inserted into a slot of the base station device 1020. Alternatively, the module may be a chip installed on the card or the blade. The RF circuit 1027 may include a mixer, a filter and an amplifier for example, and transmit and receive a wireless signal via the antenna 1010.

As shown in FIG. 10, the wireless communication interface 1025 may include multiple BB processors 1026. For example, the multiple BB processors 1026 may be compatible with multiple frequency bands used by the eNB 1000. As shown in FIG. T2, the wireless communication interface 1025 may include multiple RF circuits 1027. For example, the multiple RF circuits 1027 may be compatible with the multiple antenna elements. Although FIG. T2 shows an example in which the wireless communication interface 1025 includes multiple BB processors 1026 and multiple RF circuits 1027, the wireless communication interface 1025 may include a single BB processor 1026 or a single RF circuit 1027.

The communication apparatus according to various embodiments of the present disclosure described above may be integrated in the controller 1021 of the eNB base station described in FIG. 10, or may be included the eNB base station described in FIG. 10 as an independent communication chip.

The structure and working principles of the communication apparatus according to various embodiments of the present disclosure and the related base station are described in detail in conjunction with the drawings. Hereinafter processing flows of a communication method according to various embodiments of the present disclosure are described in detail in conjunction with the drawings.

Figure 11:
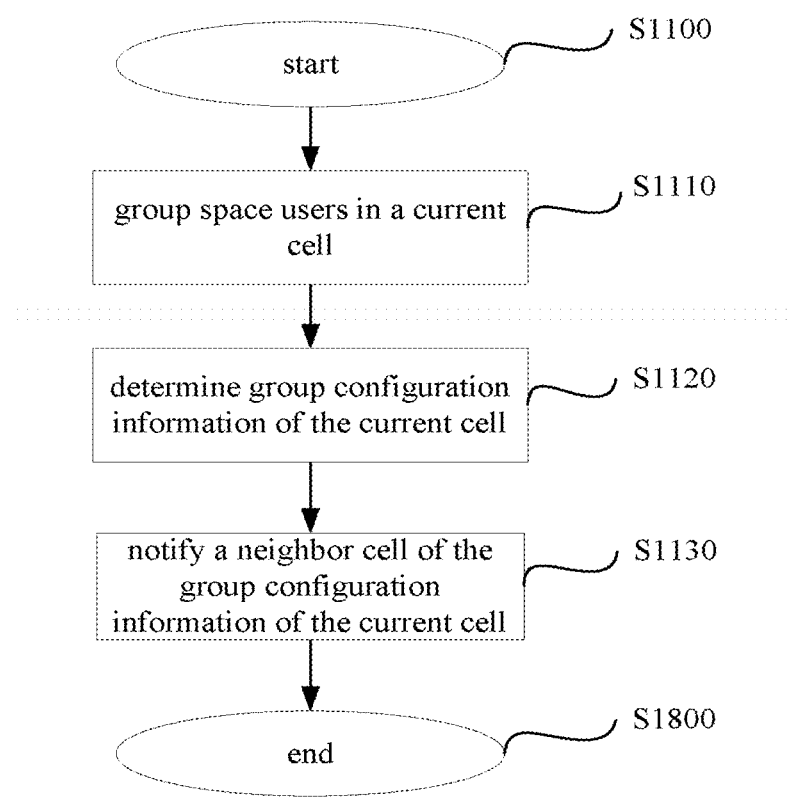
FIG. 11 shows a block diagram of processes of a communication method according to a sixth embodiment of the present disclosure.

FIG. 11 shows a block diagram of processes of a communication method according to a sixth embodiment of the present disclosure.

As shown in FIG. 11, the communication method according to the embodiment starts from step S1100. Firstly, in step S1110, users in a 3D beamforming space of a current cell are grouped into multiple space user groups. Next, in step S1120, group configuration information of the users in the 3D beamforming space of the current cell is determined. Then, in step S1130, a neighbor cell is notified of the group configuration information of the users in the 3D beamforming of the current cell to assist inter-cell interference coordination. Finally, in step S1800, the processing ends.

Here, the current cell is configured with an array antenna including multiple physical antennae to achieve 3D beamforming.

The group configuration information of the users in the 3D beamforming space of the current cell determined in step S1120 may include but not limited to at least one of the following information: whether the users are grouped statically or dynamically; the number of different space user groups of which the users are scheduled simultaneously by the current cell through 3D beamforming on a same resource block; the number of users of each of the multiple space user groups; traffic flow and/or service quality (QoS) requirements of each of the multiple space user groups; a horizontal angle area and a vertical angle area of each of the multiple space user groups; and scheduling resources corresponding to each of the multiple space user groups.

Processing in step S1110, step S1120, and step S1130 of the communication method according to the embodiment is similar to processing of the user grouping unit 110, the group configuration information determining unit 120 and the notifying unit 130 in the communication apparatus described according to the first embodiment above respectively, which is not described in detail here.

With the communication method for performing wireless communication in a wireless communication system according to the embodiment, the neighbor cell can be notified of the group configuration information of the users in the 3D beamforming space of the current cell in a timely manner, thereby facilitating interference coordination between adjacent cells and being beneficial to optimize network scheduling.

Figure 12:
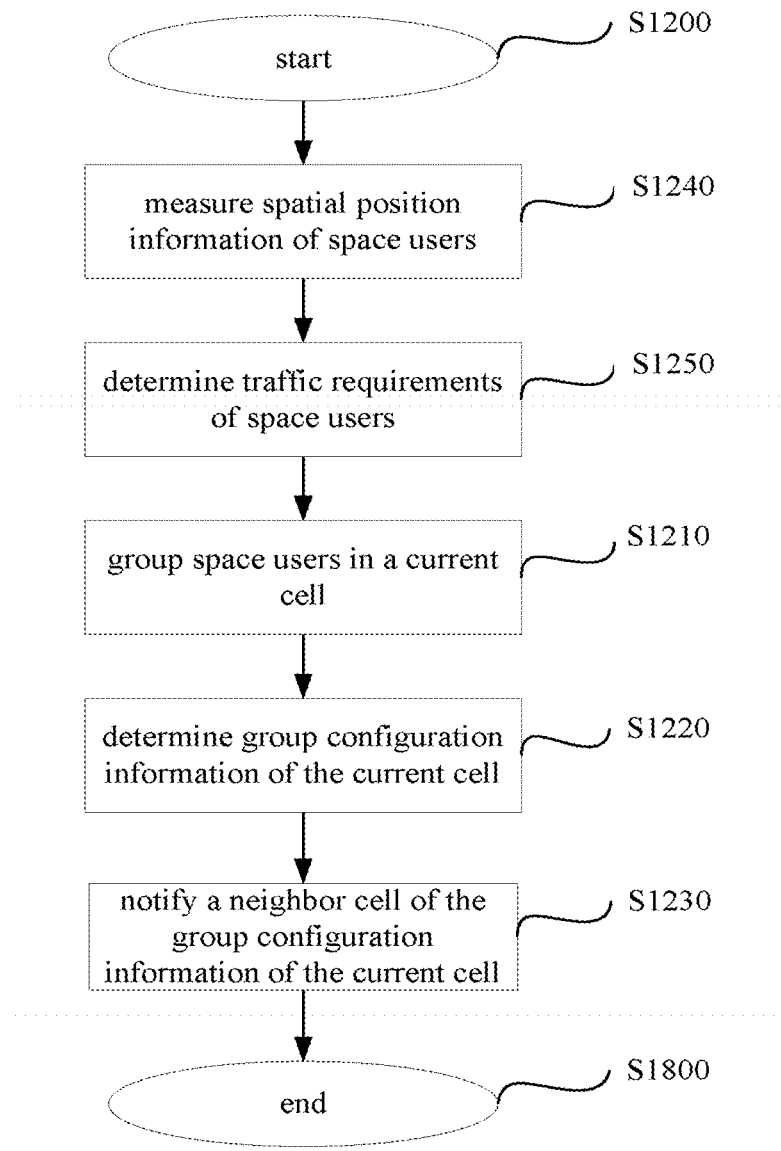
FIG. 12 shows a block diagram of processes of a communication method according to a seventh embodiment of the present disclosure.

FIG. 12 shows a block diagram of processes of a communication method according to a seventh embodiment of the present disclosure.

As shown in FIG. 12, the communication method according to the embodiment starts from step S1200. Firstly, in step S1240, spatial position information of users in a 3D beamforming space is measured according to uplink channel sounding information and/or satellitic geographical position information of an auxiliary global navigation satellite system (A-GNSS). In step S1250, traffic requirements of the user are determined, where the traffic requirements include traffic flow and/or service quality (QoS) requirements.

Then, in step S1210, the users are grouped statically and/or dynamically based on the spatial position information measured in step S1240 and/or the traffic requirements determined in step S1250, to group the users in the 3D beamforming space of the current cell into multiple space user groups. In a case of grouping statically, users in an area at a predetermined horizontal angle and a predetermined vertical angle in the 3D beamforming space are grouped into one space user group. In a case of grouping dynamically, it is ensured that spatial positions of users in respective dynamic groups are close to each other and traffic loads of the respective dynamic groups are balanced as much as possible. Similarly, the users may be grouped statically and/or dynamically in combination or independently based on channel correlation between UEs.

Next, in step S1220, group configuration information of users in the 3D beamforming space of the current cell is determined. Then, in step S1230, a neighbor cell is notified of the group configuration information of the users in the 3D beamforming space of the current cell to assist inter-cell interference coordination. Finally, in step S1800, the processing ends.

Processing in step S1210, step S1220, step S1230, step S1240 and step S1250 of the communication method according to the embodiment is similar to processing of the user grouping unit 210, the group configuration information determining unit 220, the notifying unit 230, the spatial position information measuring unit 240 and the traffic requirement determining unit 250 in the communication apparatus described according to the second embodiment above respectively, which is not described in detail here.

Similarly, with the communication method for performing wireless communication in a wireless communication system according to the embodiment, the neighbor cell can be notified of the group configuration information of the users in the 3D beamforming space of the current cell in a timely manner, thereby facilitating interference coordination between adjacent cells and being beneficial to optimize network scheduling.

Figure 13:
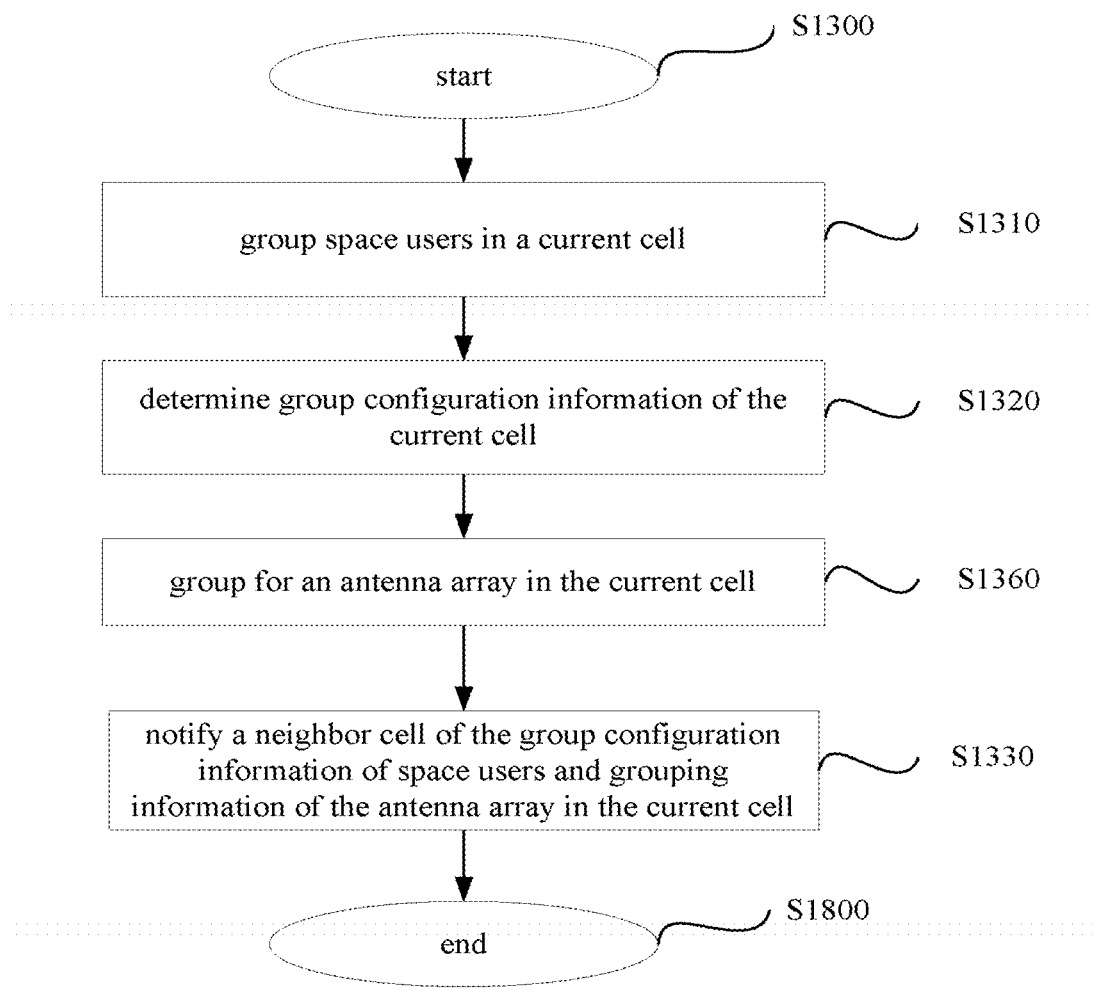
FIG. 13 shows a block diagram of processes of a communication method according to an eighth embodiment of the present disclosure.

FIG. 13 shows a block diagram of processes of a communication method according to an eighth embodiment of the present disclosure.

As shown in FIG. 13, the communication method according to the embodiment starts from step S1300. Firstly, in step S1310, users in a 3D beamforming space of a current cell are grouped into multiple space user groups. Next, in step S1320, group configuration information of the users in the 3D beamforming space of the current cell is determined.

Then, in step S1360, multiple physical antennae are grouped into multiple antenna groups according to configuration information of cell transmission antennae and the group configuration information of the users. Each antenna group includes N antennae, where $N=2^n$, and n is a non-negative integer.

Next, in step S1330, a neighbor cell is notified of the group configuration information of the users in the 3D beamforming space of the current cell and transmission modes of a physical downlink control channel (PDCCH) and/or a common reference signal (CRS) of the current cell on the antenna array. Finally, in step S1800, the processing ends.

Here, the transmission modes of the physical downlink control channel (PDCCH) and/or the common reference signal (CRS) may include but not limited to at least one of the following transmission modes: a mode in which all the antenna groups transmit the physical downlink control channel (PDCCH) and/or the common reference signal (CRS); a mode in which only antenna groups transmitting a physical downlink shared channel (PDSCH), a demodulation reference signal (DMRS) and/or a channel state information reference signal (CSI-RS) transmit the physical downlink control channel (PDCCH) and/or the common reference signal (CRS); a mode in which only one fixed antenna group transmits the physical downlink control channel (PDCCH) and/or the common reference signal (CRS); and a mode in which the physical downlink control channel (PDCCH) and/or the common reference signal (CRS) is transmitted on multiple fixed antennae in the antenna array.

Similarly, the current cell may transmit the physical downlink control channel (PDCCH) and/or the common reference signal (CRS) according to the determined transmission modes. For an antenna group which transmits the physical downlink control channel (PDCCH) and/or the common reference signal (CRS), 1/2/4 antennae are selected from the antenna group including N antennae to transmit the physical downlink control channel (PDCCH) and/or the common reference signal (CRS), and the remaining N−1/N−2/N−4 antennae copy transmission content of the 1/2/4 antennae or keep silence.

When providing data transmission service to corresponding space user groups utilizing respective antenna groups, in a physical downlink shared channel (PDSCH), one antenna group only sends one wave beam to one user in each space user group. In addition, both a different in a horizontal angle and a difference in a vertical angle between users in different space user groups scheduled simultaneously on a same block of time frequency resource should be larger than a predetermined threshold value; or angles of connection lines formed between the antenna and the users in different space user groups scheduled simultaneously on a same block of time frequency resource should be larger than a predetermined threshold value. Otherwise, re-scheduling is to be performed.

Processing in step S1310, step S1320, step S1330 and step S1360 of the communication method according to the embodiment is similar to processing of the user grouping unit 510, the group configuration information determining unit 520, the notifying unit 530 and the antenna grouping unit 560 in the communication apparatus described according to the third embodiment above respectively, which is not described in detail here.

Similarly, with the communication method for performing wireless communication in a wireless communication system according to the embodiment, the multiple physical antennae in an antenna array provided for the current cell are grouped, and pilot design before Rel-12 can be reused, thereby reducing overhead of the reference signal.

Figure 14:
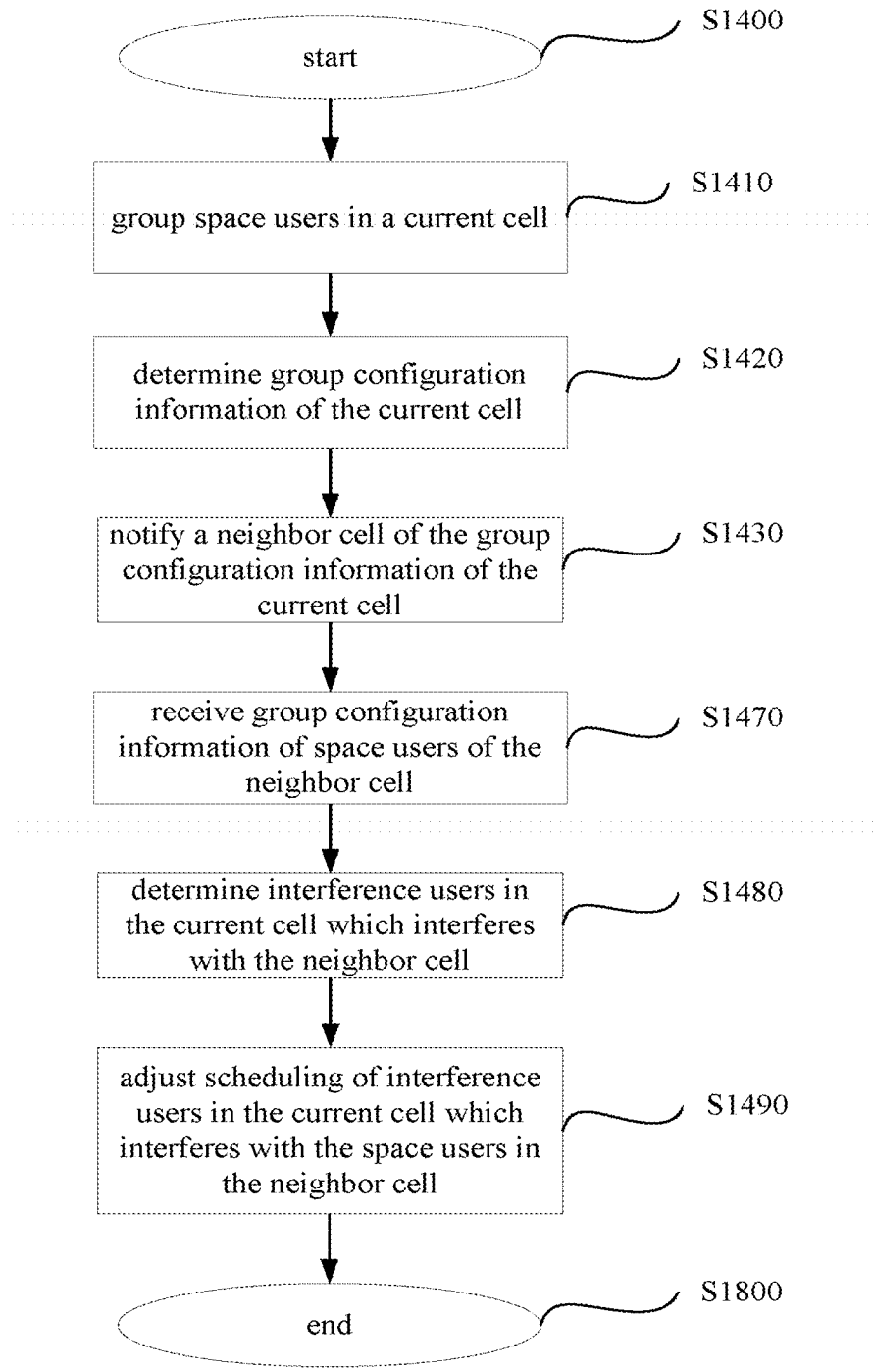
FIG. 14 shows a block diagram of processes of a communication method according to a ninth embodiment of the present disclosure.

FIG. 14 shows a block diagram of processes of a communication method according to a ninth embodiment of the present disclosure.

As shown in FIG. 14, the communication method according to the embodiment starts from step S1400. Firstly, in step S1410, users in a 3D beamforming space of a current cell are grouped into multiple space user groups. Next, in step S1420, group configuration information of the users in the 3D beamforming space of the current cell is determined. Then, in step S1430, a neighbor cell is notified of the group configuration information of the users in the 3D beamforming space of the current cell to assist inter-cell interference coordination.

Next, in step S1470, group configuration information of users in a 3D beamforming space of the neighbor cell is received. In step S1480, a space user group in the neighbor cell which interferes with the current cell and a space user group in the current cell which interferes with the neighbor cell are determined according to the received group configuration information of the neighbor cell. Then, in step S1490, scheduling of the users in the space user group of the current cell which interferes with the neighbor cell is adjusted and/or the neighbor cell is required to adjust scheduling of users interfering with the current cell for example. Finally, in step S1800, the processing ends.

In step S1480, if a difference between a horizontal angle $\alpha_i$ of a user in the current cell and a horizontal angle $\alpha_j$ of a user in the neighbor cell and a difference between a vertical angle $\beta_i$ of a user in the current cell and a vertical angle $\beta_j$ of a user in the neighbor cell are less than a predetermined threshold value, a space user group where the user of the current cell is located is determined as the space user group interfering with the neighbor cell. In this case, in step S1490, the adjusting scheduling of users in the space user group of the current cell which interferes with the neighbor cell includes: re-scheduling and ensuring that the re-scheduling does not schedule the users in the current cell on resources used by users in the space user group interfering with the neighbor cell.

In addition, in the communication method according to the embodiment, in step S1490, after the scheduling of the users in the current cell is adjusted, the neighbor cell is notified of a potential space user group in the current cell which interferes with the neighbor cell after adjusting and its scheduling resources which are limited to use. On this point, it is not shown in FIG. 14.

Processing in step S1410, step S1420, step S1430, step S1470, step S1480 and step S1490 of the communication method according to the embodiment is similar to processing of the user grouping unit 810, the group configuration information determining unit 820, the notifying unit 830, the receiving unit 870, the interference user determining unit 880 and the scheduling adjusting unit 890 in the communication apparatus described according to the fourth embodiment above respectively, which is not described in detail here.

With the communication method for performing wireless communication in a wireless communication system according to the embodiment, not only the neighbor cell is notified of the group configuration information of the users in the 3D beamforming space of the current cell in a timely manner, but also the scheduling of the users of the current cell can be adjusted according to the group configuration information of the users in the 3D beamforming space of the neighbor cell in a timely manner and the neighbor cell is notified of the adjusted scheduling result, thereby facilitating interference coordination between adjacent cells and being beneficial to optimize network scheduling.

Figure 15:
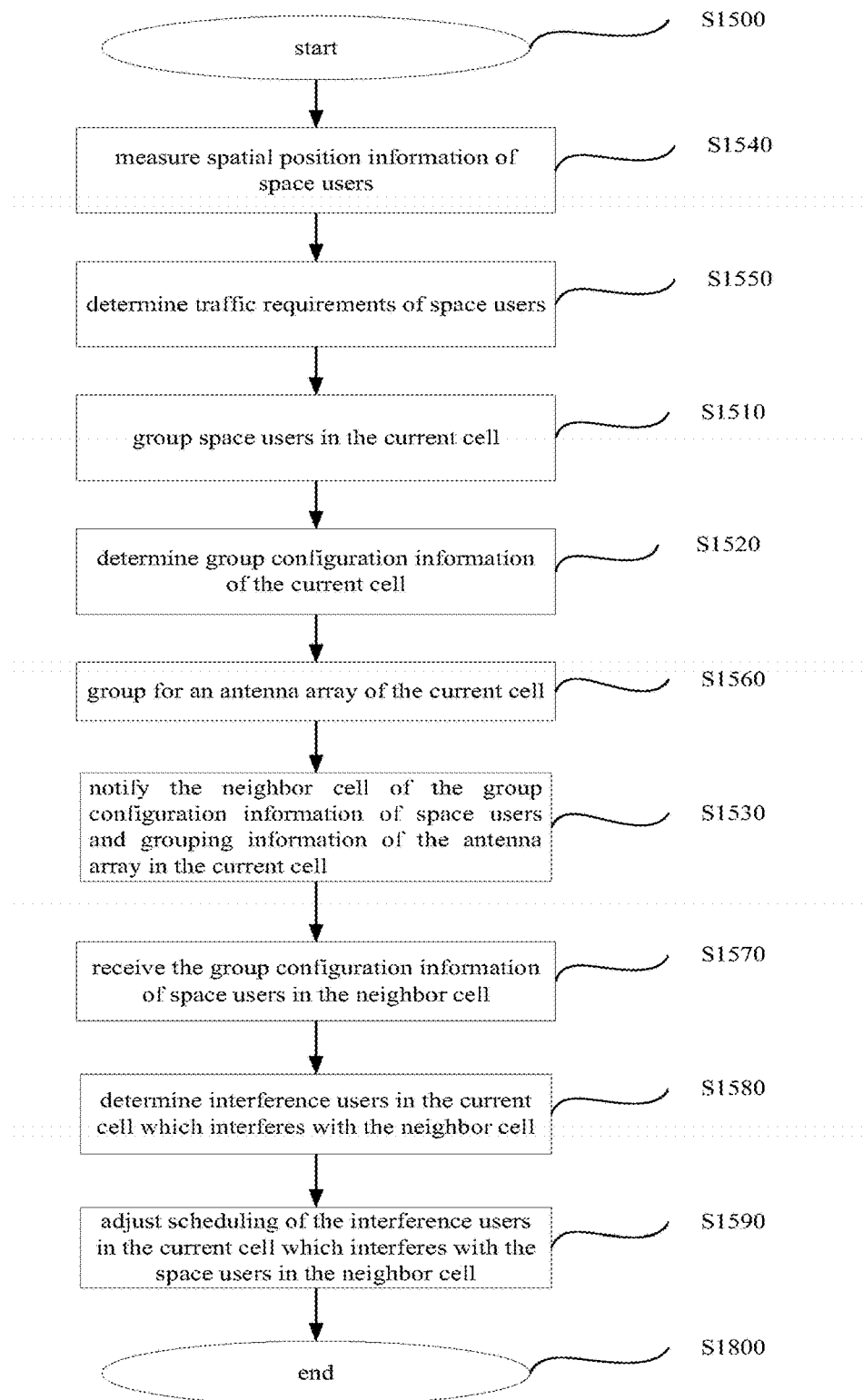
FIG. 15 shows a block diagram of processes of a communication method according to a tenth embodiment of the present disclosure.

FIG. 15 shows a block diagram of processes of a communication method according to a tenth embodiment of the present disclosure.

As shown in FIG. 15, the communication method according to the embodiment starts from step S1500. Firstly, in step S1540, spatial position information of users in 3D beamforming space is measured according to uplink channel sounding information and/or satellite geographical position information of an auxiliary global navigation satellite system (A-GNSS). In step S1550, traffic requirements of the users are determined, where the traffic requirements includes traffic flow and/or service quality (QoS) requirements.

Then, in step S1510, the users are grouped statically and/or dynamically based on the spatial position information measured in step S1540 and/or the traffic requirements determined in step S1550, to group the users in the 3D beamforming space of the current cell into multiple space user groups. In a case of grouping statically, the users in an area at a predetermined horizontal angle and a predetermined vertical angle in the 3D beamforming space are grouped into one space user group. In a case of grouping dynamically, it is ensured that spatial positions of users in respective dynamic groups are close to each other and traffic loads of the respective dynamic groups are balanced as much as possible. Similarly, the users may be grouped statically and/or dynamically in combination with or independently based on channel correlation between UEs.

Next, in step S1520, group configuration information of the users in the 3D beamforming space of the current cell is determined. Then, in step S1560, multiple physical antennae are grouped into multiple antenna groups according to configuration information of cell transmission antennae and the group configuration information of the users. Each antenna group includes N antennae, where $N=2^n$ and n is a non-negative integer.

Next, in step S1530, the neighbor cell is notified of the group configuration information of the users in the 3D beamforming space of the current cell and transmission modes of a physical downlink control channel (PDCCH) and/or a common reference signal (CRS) of the current cell on the antenna array.

Then, in step S1570, group configuration information of users in 3D beamforming space of the neighbor cell is received. In step S1580, a space user group in the neighbor cell which interferes with the current cell and a space user group in the current cell which interferes with the neighbor cell are determined according to the received group configuration information of the neighbor cell. Next, in step S1590, scheduling of the users in the space user group in the current cell which interferes with the neighbor cell is adjusted and/or the neighbor cell is required to adjust the scheduling of users interfering with the current cell for example. Finally, in step S1800, the processing ends.

Similarly, in the communication method according to the embodiment, if it is determined in step S1580 that there is a space user group in the current cell which interferes with the neighbor cell, in step S1590, it is re-scheduled and ensured that the re-scheduling does not schedule a user in the current cell on resources used by the users in the space user group interfering with the neighbor cell, and the neighbor cell is notified of a potential space user group in the current cell which interferes with the neighbor cell after adjusting and its scheduling resources which are limited to use. On this point, it is not shown in FIG. 15.

Processing in step S1510, step S1520, step S1530, step S1540, step S1550, step S1560, step S1570, step S1580 and step S1590 of the communication method according to the embodiment is similar to the processing of the user grouping unit 910, the group configuration information determining unit 920, the notifying unit 930, the spatial position information measuring unit 940, the traffic requirement determining unit 950, the antenna grouping unit 960, the receiving unit 970, the interference user determining unit 980 and the scheduling adjusting unit 990 in the communication apparatus described according to the fourth embodiment above respectively, which is not described in detail here.

The communication apparatus for performing wireless communication in a wireless communication system according to the embodiment can notify the neighbor cell of the group configuration information of the users in the 3D beamforming space of the current cell in a timely manner, thereby facilitating interference coordination between adjacent cells and being beneficial to optimize network scheduling.

The communication apparatus for performing wireless communication in a wireless communication system according to the embodiment can further group the multiple physical antennae in the antenna array provided for the current cell, and reuse pilot design before the Rel-12, thereby reducing overhead of the reference signal.

In addition to notifying the neighbor cell of the group configuration information of the users in the 3D beamforming space of the current cell in a timely manner, the communication apparatus for performing wireless communication in a wireless communication system according to the embodiment can further adjust the scheduling of the users in the current cell according to the group configuration information of the users in the 3D beamforming space of the neighbor cell in a timely manner and notify the neighbor cell of the adjusted scheduling result, thereby facilitating interference coordination between adjacent cells and being beneficial to optimize network scheduling.

The processing flows of the communication method according to various embodiments of the present disclosure are described in conjunction with the drawings. However, it should be noted that, specific examples of the communication method according to the present disclosure are not limited to several examples described above, and these embodiments may be combined, decomposed, adjusted and changed in any way. For example, the communication method according to the seventh embodiment and the communication method according to the eighth embodiment and/or the ninth embodiment described above may be combined, and the communication method according to the eighth embodiment and the communication method according to the ninth embodiment described above may be combined and so on, and the variation embodiments each fall within the scope of protection of the present disclosure.

It should be noted that, various operation processes of the method for performing wireless communication in a wireless communication system according to the present disclosure may be implemented by running programs on one processor or by running programs on multiple processors.

In addition, various operation processes of the method for performing wireless communication in a wireless communication system according to the present disclosure may be implemented by performing various operation processes of the communication method according to the present disclosure by a circuit included in the communication apparatus.

In addition, obviously various operation processes of the method for performing wireless communication in a wireless communication system according to the present disclosure may be implemented by computer executable programs stored in various machine readable storage mediums.

In addition, the objects of the present disclosure may be implemented by the following way: providing the storage medium storing the executable program codes described above to a system or a device directly or indirectly, and reading and executing the program codes by a computer or a central processing unit (CPU) in the system or the device. In this case, as long as the system or the device has a function of executing programs, the embodiments of the present disclosure are not limited to programs. The programs may be of any form, for example, target programs, programs executed by an explainer or scripts provided to the operating system.

The machine readable storage medium includes but not limited to various memories and storing units, semiconductor devices, magnetic disk units, for example an optical disk, a magnetic disk and a magnetic-optical disk, and other mediums adapting to store information.

In addition, the technical solutions of the present disclosure may also be implemented by the following way. The computer downloads and installs the computer program codes according to the present disclosure, via a corresponding web site connected to the Internet, and then executes the programs.

In addition, it should be noted that, various components in the device may be configured by software, firmware, hardware or a combination thereof. Specific means or ways usable in the configuration are well known for those skilled in the art, which are not described in detail here. In a case of implementing by software or firmware, programs constituting the software are installed to a computer with a dedicated hardware structure (for example a general-purpose computer 1600 shown in FIG. 16) from the storage medium or network. The computer can perform various types of functions when installing with various types of programs.

Figure 16:
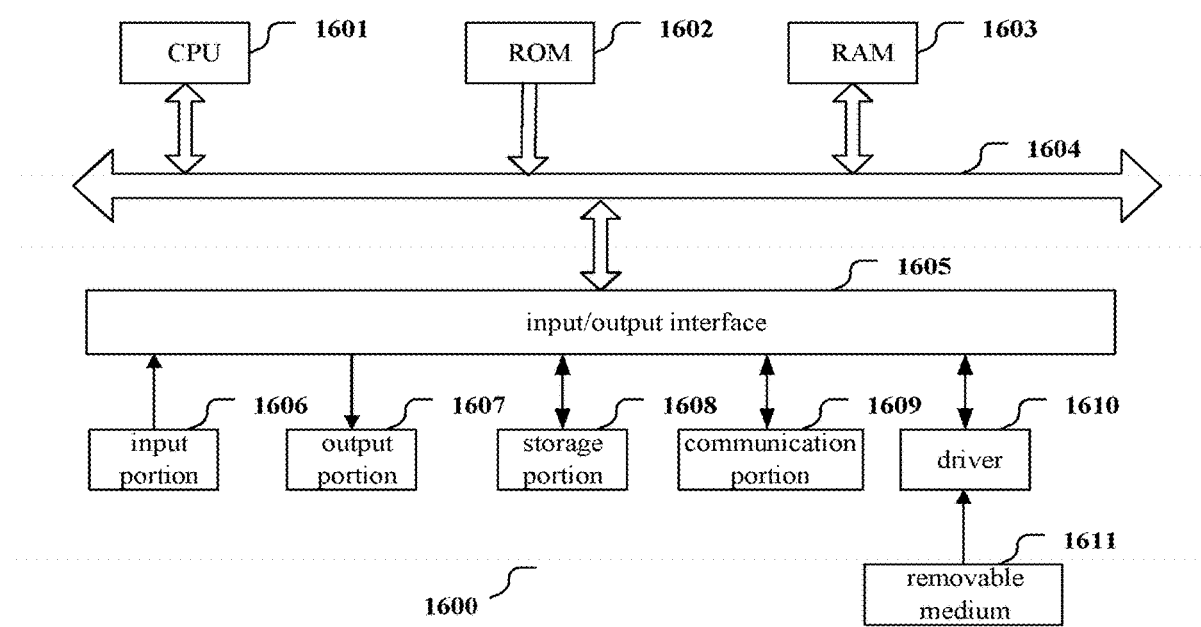
FIG. 16 shows a block diagram of a schematic structure of a general-purpose personal computer which may implement the method for performing wireless communication in a wireless communication system according to an embodiment of the present disclosure.

FIG. 16 shows a block diagram of a schematic structure of a general-purpose personal computer which may achieve the method for performing wireless communication in a wireless communication system according to the embodiment of the present disclosure.

In FIG. 16, a central processing unit (CPU) 1601 performs various types of processing according to programs stored in a read only memory (ROM) 1602 or programs loaded from a storage portion 1608 to a random access memory (RAM) 1603. Data required when the CPU 1601 performs various types of processing is stored in the RAM 1603 as needed. The CPU 1601, the ROM 1602 and the RAM 1603 are connected to each other via a bus 1604. An input/output interface 1605 is also connected to the bus 1604.

The following components are connected to the input/output interface 1605: an input portion 1606 (including a keyboard, and a mouse and so on), an output portion 1607 (including a display, for example a cathode ray tube (CRT) and a liquid crystal display (LCD), and a loudspeaker), a storage portion 1608 (including a hard disk and so on), and a communication portion 1609 (including a network interface card for example a local area network (LAN) card, and a modem). The communication portion 1609 performs communication processing via a network for example the Internet. A driver 1610 may also be connected to the input/output interface 1605 as needed. A removable medium 1611 for example a magnetic disk, an optical disk, a magnetic-optical disk and a semiconductor memory may be installed on the driver 1610 as needed, so that computer programs read from the removable medium 1611 are installed on the storage portion 1608 as needed.

In a case of performing the series of processing described above by software, programs constituting the software are installed from the network for example the Internet or the storage medium for example the removable medium 1611.

Those skilled in the art should understand that the storage medium is not limited to the removable medium 1611 shown in FIG. 16 which stores programs and is distributed separately from the device to the user to provide the programs. Examples of the removable medium 1611 include: a magnetic disk (including a floppy disk (registered trademark), an optical disk (including a compact disk (CD)-ROM) and a digital versatile disk (DVD), a magnetic-optical disk (including a mini disk (MD) (trademark)), and a semiconductor memory. Alternatively, the storage medium may be a hard disk included in the ROM 1602 and the storage portion 1608 which stores programs. The storage medium and the device including thereof together are distributed to the user.

According to the present disclosure, a program product storing machine readable instruction codes is further provided. When read and executed by the machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory bar.

In the description of specific embodiments of the present disclosure, features described and/or illustrated for one embodiment may be used in one or more other embodiments in the same or similar way, combined with features in other embodiments or replace features in other embodiments.

It should be noted that, terms "including/comprising" used herein refers to existence of features, elements, steps or components, but existence or adding of one or more other features, elements, steps or components are not excluded.

In the system and method of the present disclosure, obviously, various components or steps may be decomposed and/or recombined. The decomposition and/or recombination should be regarded as equivalent solutions of the present disclosure. In addition, steps for performing the series of processing described above may be performed naturally according to the order described and in the time order, but the steps are not necessary to be performed in the time order. Certain steps may be performed in parallel or independently from each other. Therefore, the order for performing the method described in the specification does not limit the technical scope of the present disclosure.

Although the embodiments of the present disclosure are described in detail in conjunction with the drawings above, it should be understood that the embodiments described above are only used to illustrate the present disclosure and are not intended to limit the present disclosure. For those skilled in the art, various changes and variations may be made to the above embodiments without departing from the essence and scope of the present disclosure. Therefore, the scope of the present disclosure is only defined by the appended claims and the equivalent meanings thereof.

The invention claimed is:

1. A communication apparatus, comprising:
processing circuitry configured to
group users in a 3D beamforming space of a current cell into a plurality of space user groups;
determine group configuration information of the users in the 3D beamforming space of the current cell; and
notify a neighbor cell of the group configuration information of the users in the 3D beamforming space of the current cell to assist inter-cell interference coordination, the group configuration information including information regarding whether the users are grouped statically or dynamically, the information regarding whether the users are grouped statically or dynamically indicating whether the users are grouped based on a fixed rule that does not change depending on time or an unfixed rule that changes depending on time, wherein
the current cell is configured with an antenna array comprising a plurality of physical antennae to achieve 3D beamforming, and
the fixed rule is based on a predetermined space area range, and the unfixed rule is based on a current traffic requirement.

2. The communication apparatus according to claim 1, wherein the group configuration information of the users in the 3D beamforming space further comprises at least one of the followings:
the number of different space user groups of which the users are simultaneously scheduled by the current cell through 3D beamforming on a same resource block;
the number of users of each of the plurality of space user groups;
traffic flow and/or service quality requirements of each of the plurality of space user groups;
a horizontal angle area and a vertical angle area of each of the plurality of space user groups; and
scheduling resources corresponding to each of the plurality of space user groups.

3. The communication apparatus according to claim 1, wherein the processing circuitry is further configured to:
measure spatial position information of the users in the 3D beamforming space according to uplink channel sounding information and/or satellitic geographical position information of an auxiliary global navigation satellite system,
wherein the processing circuitry is further configured to group the users in the 3D beamforming space of the current cell into a plurality of space user groups based on the spatial position information.

4. The communication apparatus according to claim 3, wherein the processing circuitry is further configured to group users located in an area at a predetermined horizontal angle and a predetermined vertical angle in the 3D beamforming space into one space user group, so as to group the users statically.

5. The communication apparatus according to claim 3, wherein the processing circuitry is further configured to:
determine traffic requirements of the users, the traffic requirements comprising traffic flow and/or service quality requirements; and
group the users dynamically based on the spatial position information and the traffic requirements, so that spatial positions of users in respective dynamic groups are close to each other and traffic loads of the respective dynamic groups are balanced.

6. The communication apparatus according to claim 1, wherein the processing circuitry is further configured to:
group the plurality of physical antennae into a plurality of antenna groups according to the group configuration information of the users,
wherein each of the plurality of antenna groups comprises N antennae, where N=2n, and n is a non-negative integer.

7. The communication apparatus according to claim 6, wherein:
the processing circuitry is further configured to notify the neighbor cell of transmission modes of a physical downlink control channel and/or a common reference signal of the current cell on the antenna array; and
the transmission modes of the physical downlink control channel and/or the common reference signal comprise at least one of the following transmission modes:
a mode in which all the antenna groups transmit the physical downlink control channel and/or the common reference signal;
a mode in which only antenna groups transmitting a physical downlink shared channel, a demodulation reference signal and/or a channel state information reference signal transmit the physical downlink control channel and/or the common reference signal;
a mode in which only one fixed antenna group transmits the physical downlink control channel and/or the common reference signal; and
a mode in which the physical downlink control channel and/or the common reference signal is transmitted on a plurality of fixed antennae in the antenna array.

8. The communication apparatus according to claim 7, wherein:
the antenna array is configured to transmit the physical downlink control channel and/or the common reference signal according to the transmission modes; and
for an antenna group which transmits the physical downlink control channel and/or the common reference signal, 1/2/4 antennae are selected from the antenna group comprising N antennae to transmit the physical downlink control channel and/or the common reference signal, and the remaining N-1/N-2/N-4 antennae copy transmission content of the 1/2/4 antennae or keep silence.

9. The communication apparatus according to claim 8, wherein:
the respective antenna groups provide data transmission services to corresponding space user groups; and
in the physical downlink shared channel, one antenna group transmits only one wave beam to one user in each of the plurality of space user groups.

10. The communication apparatus according to claim 9, wherein both a difference value in a horizontal angle and a difference value in a vertical angle between users in different space user groups scheduled simultaneously on a same block of time frequency resource are larger than a predetermined threshold value; or angles of connection lines formed between the antennae and users in different space user groups scheduled simultaneously on a same block of time frequency resource are larger than a predetermined threshold value.

11. The communication apparatus according to claim 1, wherein the processing circuitry is further configured to:
receive group configuration information of users in a 3D beamforming space of the neighbor cell;
determine, according to the received group configuration information of the neighbor cell, a space user group in the current cell, which interferes with the neighbor cell; and
adjust scheduling of users in the space user group in the current cell, which interferes with the neighbor cell.

12. The communication apparatus according to claim 11, wherein, if both a difference value between a horizontal angle of users in the current cell and a horizontal angle of users in the neighbor cell and a difference value between a vertical angle of users in the current cell and a vertical angle of users in the neighbor cell are less than a predetermined threshold value, the processing circuitry is further configured to determine that a space user group where the users in the current cell are located is the space user group interfering with the neighbor cell.

13. The communication apparatus according to claim 12, wherein the processing circuitry is further configured to re-schedule and ensure that the re-scheduling does not schedule the users in the current cell on resources used by the users in the space user group interfering with the neighbor cell.

14. The communication apparatus according to claim 12, wherein the processing circuitry is further configured to notify the neighbor cell of the space user group in the current cell, which interferes with the neighbor cell, as well as scheduling resources used by the space user group.

15. A base station, comprising the communication apparatus of claim 1.

16. The communication apparatus according to claim 1, wherein the group configuration information of the users in the 3D beamforming space further includes the number of different space user groups of which the users are simultaneously scheduled by the current cell through 3D beamforming on a same resource block.

17. The communication apparatus according to claim 1, wherein the group configuration information of the users in the 3D beamforming space further includes the number of users of each of the plurality of space user groups.

18. The communication apparatus according to claim 1, wherein the group configuration information of the users in the 3D beamforming space further includes traffic flow and/or service quality requirements of each of the plurality of space user groups.

19. A communication method, comprising:
grouping users in a 3D beamforming space of a current cell into a plurality of space user groups;
determining group configuration information of the users in the 3D beamforming space of the current cell; and
notifying a neighbor cell of the group configuration information of the users in the 3D beamforming space of the current cell to assist inter-cell interference coordination, the group configuration information including information regarding whether the users are grouped statically or dynamically, the information regarding whether the users are grouped statically or dynamically indicating whether the users are grouped based on a fixed rule that does not change depending on time or an unfixed rule that changes depending on time, wherein
the current cell is configured with an antenna array comprising a plurality of physical antennae to achieve 3D beamforming, and
the fixed rule is based on a predetermined space area range, and the unfixed rule is based on a current traffic requirement.

20. The communication method according to claim 19, wherein the group configuration information of the users in the 3D beamforming space comprises at least one of the followings:

the number of different space user groups of which the users are simultaneously scheduled through 3D beamforming on a same resource block;

the number of users of each of the plurality of space user groups;

traffic flow and/or service quality requirements of each of the plurality of space user groups;

a horizontal angle area and a vertical angle area of each of the plurality of space user groups; and scheduling resources corresponding to each of the plurality of space user groups.

21. The communication method according to claim 19, further comprising:

measuring spatial position information of the users in the 3D beamforming space according to uplink channel sounding information and/or satellitic geographical position information of an auxiliary global navigation satellite system, wherein the users in the 3D beamforming space of the current cell are grouped into a plurality of space user groups based on the spatial position information.

22. The communication method according to claim 21, wherein users located in an area at a predetermined horizontal angle and a predetermined vertical angle in the 3D beamforming space are grouped into one space user group, so as to be grouped statically.

23. The communication method according to claim 21, further comprising:

determining traffic requirements of the users, the traffic requirements comprising traffic and/or service quality requirements; and wherein the grouping the users in the 3D beamforming space of the current cell into a plurality of space user groups based on the spatial position information further comprises: performing a dynamic grouping of the users based on the spatial position information and the traffic requirements, so that spatial positions of users in respective dynamic groups are close to each other and traffic loads of the respective dynamic groups are balanced.

* * * * *